United States Patent
Scoones et al.

(10) Patent No.: US 10,468,988 B2
(45) Date of Patent: Nov. 5, 2019

(54) THREE-LEVEL CONVERTER USING AN AUXILIARY SWITCHED CAPACITOR CIRCUIT

(71) Applicant: Texas Instruments Incorporated, Dallas, TX (US)

(72) Inventors: Kevin Scoones, San Jose, CA (US); Orlando Lazaro, Dallas, TX (US); Alvaro Aguilar, Irving, TX (US); Jeffrey Anthony Morroni, Parker, TX (US); Reza Sharifi, Sunnyvale, CA (US); Saurav Bandyopadhyay, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 16/058,859

(22) Filed: Aug. 8, 2018

(65) Prior Publication Data

US 2019/0028031 A1 Jan. 24, 2019

Related U.S. Application Data

(63) Continuation of application No. 15/697,275, filed on Sep. 6, 2017, now Pat. No. 10,075,080.
(Continued)

(51) Int. Cl.
*H02M 3/158* (2006.01)
*H02M 1/00* (2006.01)
*H02M 7/483* (2007.01)

(52) U.S. Cl.
CPC ......... *H02M 3/1588* (2013.01); *H02M 3/158* (2013.01); *H02M 7/483* (2013.01); *H02M 2001/0006* (2013.01)

(58) Field of Classification Search
CPC ............... H02M 1/158; H02M 3/1588; H02M 2001/0006; H02M 7/483
See application file for complete search history.

(56) References Cited

U.S. PATENT DOCUMENTS 4,203,151 A * 5/1980 Baker .................. H02M 7/487
363/132
5,684,688 A * 11/1997 Rouaud .................. H02M 1/34
363/132

(Continued)

OTHER PUBLICATIONS

David Clayton Reusch, "High frequency, high power density integrated point of load and bus converters," Virginia Tech PhD Dissertation, 2012; retrieved on Sep. 6, 2017 from the internet at the uniform resource locator (url): https://theses.lib.vt.edu/theses/available/etd-04162012-151740/unrestricted/Reusch_4_15_12_Final.pdf.

*Primary Examiner* — Kyle J Moody
(74) *Attorney, Agent, or Firm* — Tuenlap Chan; Charles A. Brill; Frank D. Cimino

(57) ABSTRACT

In a described example, an apparatus includes a first switch coupled between a terminal for receiving an input voltage and a top plate node, and having a first control terminal; a second switch coupled between the top plate node and a switching node, and having a second control terminal; a third switch coupled between the switching node and a bottom plate node and having a third control terminal; a fourth switch coupled between the bottom plate node and a ground terminal, and having a fourth control terminal; a flying capacitor coupled between the top plate node and the bottom plate node; a fifth switch coupled between the top plate node and an auxiliary node; a sixth switch coupled between the auxiliary node and the bottom plate node; and an auxiliary capacitor coupled between the auxiliary control terminal and a ground terminal.

19 Claims, 11 Drawing Sheets

Related U.S. Application Data

(60) Provisional application No. 62/533,963, filed on Jul. 18, 2017.

(56) References Cited

U.S. PATENT DOCUMENTS

| | | | | |
|---|---|---|---|---|
| 6,480,403 | B1* | 11/2002 | Bijlenga | H02M 7/487 |
| | | | | 363/132 |
| 9,214,878 | B2* | 12/2015 | Takizawa | H02M 7/487 |
| 9,337,732 | B2 | 5/2016 | Kondou et al. | |
| 9,559,523 | B2* | 1/2017 | Zabaleta Maeztu | H02M 7/483 |
| 9,780,663 | B2* | 10/2017 | Lidsky | H02M 3/158 |
| 9,871,467 | B2 | 1/2018 | Liang et al. | |
| 10,084,391 | B2* | 9/2018 | Xu | H02J 3/38 |
| 2008/0315859 | A1* | 12/2008 | Ponnaluri | H02M 7/487 |
| | | | | 323/351 |
| 2015/0280608 | A1 | 10/2015 | Yoscovich et al. | |
| 2016/0268924 | A1* | 9/2016 | Fu | H02M 7/483 |
| 2017/0054298 | A1* | 2/2017 | Fu | H02M 7/487 |
| 2017/0194860 | A1 | 7/2017 | Oak et al. | |
| 2017/0194877 | A1* | 7/2017 | Kadam | H02M 7/487 |
| 2017/0310238 | A1* | 10/2017 | Fu | H02M 7/487 |
| 2017/0338747 | A1 | 11/2017 | Liang et al. | |
| 2018/0062537 | A1* | 3/2018 | Wang | H02M 1/08 |
| 2018/0115243 | A1* | 4/2018 | Fu | H02M 3/158 |
| 2018/0219492 | A1* | 8/2018 | Shi | H02M 7/483 |
| 2018/0248493 | A1* | 8/2018 | Mihalache | H02M 1/08 |
| 2018/0309384 | A1* | 10/2018 | Wang | H02M 7/487 |

* cited by examiner

US 10,468,988 B2

THREE-LEVEL CONVERTER USING AN AUXILIARY SWITCHED CAPACITOR CIRCUIT

CROSS-REFERENCE TO RELATED APPLICATIONS

Under 35 U.S.C. § 120, this continuation application claims benefits of and priority to U.S. patent application Ser. No. 15/697,275 (TI-77474), filed on Sep. 6, 2017, which under 35 U.S.C. § 119(e), claims the benefit of and priority to U.S. Provisional Application No. 62/533,963, filed Jul. 18, 2017. The entirety of the above referenced applications is hereby incorporated herein by reference.

TECHNICAL FIELD

This application relates generally to power supply circuits, and more particularly, to switching power supplies.

BACKGROUND

Switching power supplies achieve DC to DC voltage supply regulation to provide an output voltage from an input voltage. Goals for switching power supplies include high power density (such as watts per unit area or watts per unit volume) and reduced cost. Switching power supplies such as buck converters often apply two different voltages (such as ground and the input voltage) to a switching node. By using an inductor and capacitor filter coupled between the switching node and an output terminal supplying the output voltage, a DC output voltage is provided at a given level. Using pulse width modulation (PWM) to control the on time and off time for a high side switch coupled between the input voltage and the switching node, and also to control a low side switch coupled between the switching node and a ground potential, the duty cycle for the high side switch can determine the output voltage. For a switching converter in a buck topology the duty cycle is proportional to the ratio Vout/Vin. The high side and low side switches can be implemented with FET transistors that are sized to handle the current required by the output. An output inductor is series coupled between the switching node and the output voltage. In a buck converter, the switching node varies between the input voltage Vin and ground, so the output inductor must be large enough to maintain reasonable current ripple. In buck converters the output inductor is often one of the largest devices in terms of board area and volume. The output inductor is often the tallest component, which increases volume of the buck converter. The power transistors also have to be sized to handle the current and voltage variations expected.

A three-level switching power supply generates a third voltage that can be coupled to the switching node. The third voltage is typically one-half of the input voltage. In a three-level switching power supply the switching node alternates between the input voltage and one-half of the input voltage, or between one-half of the input voltage and ground. Thus for a three-level converter the magnitude of voltage transitions at the switching node is approximately one-half the magnitude of the voltage transitions that occur in a traditional switching power supply. These reduced voltage transitions at the switching node reduce voltage stress on the power supply circuit elements, potentially enabling three-level switching power supplies to be implemented with smaller and lower cost components such as smaller power transistors and a smaller output inductor. Output inductors are commonly employed in switching power supplies and are often the largest component with respect to circuit board area and spatial volume of a switching power supply. The reduced voltage transitions at the switching node results in reduced current ripple through the output inductor. For a switching duty cycle of 50% between the high and low voltages at the switching node, the current ripple may be reduced by approximately 75% for a three-level converter when compared to a switching power supply implemented without three levels. The use of the three level switching converter significantly reduces current ripple and also enables the employment of physically smaller inductors, thus increasing the power density.

SUMMARY

In a described example, an apparatus includes a first switch coupled between a terminal for receiving an input voltage and a top plate node, and having a first control terminal; a second switch coupled between the top plate node and a switching node, and having a second control terminal; a third switch coupled between the switching node and a bottom plate node and having a third control terminal; a fourth switch coupled between the bottom plate node and a ground terminal, and having a fourth control terminal; a flying capacitor coupled between the top plate node and the bottom plate node; a fifth switch coupled between the top plate node and an auxiliary node; a sixth switch coupled between the auxiliary node and the bottom plate node; and an auxiliary capacitor coupled between the auxiliary control terminal and a ground terminal.

DETAILED DESCRIPTION

Corresponding numerals and symbols in the different figures generally refer to corresponding parts unless otherwise indicated. The figures are not necessarily drawn to scale.

The term "coupled" may include connections made with intervening elements, and additional elements and various connections may exist between any elements that are "coupled." The term "line" is used herein to refer to connecting elements such as (and not limited to) metal interconnects on an integrated circuit and traces on a circuit board. A line coupled to two or more circuit elements may include intervening elements and additional elements that are not illustrated and not described herein. The incorporation of such intervening and additional elements is dependent upon a circuit implementation for a specific application. Examples of intervening and additional elements include and are not limited to buffers to increase signal drive strength and passive elements such as resistors.

Figure 1:
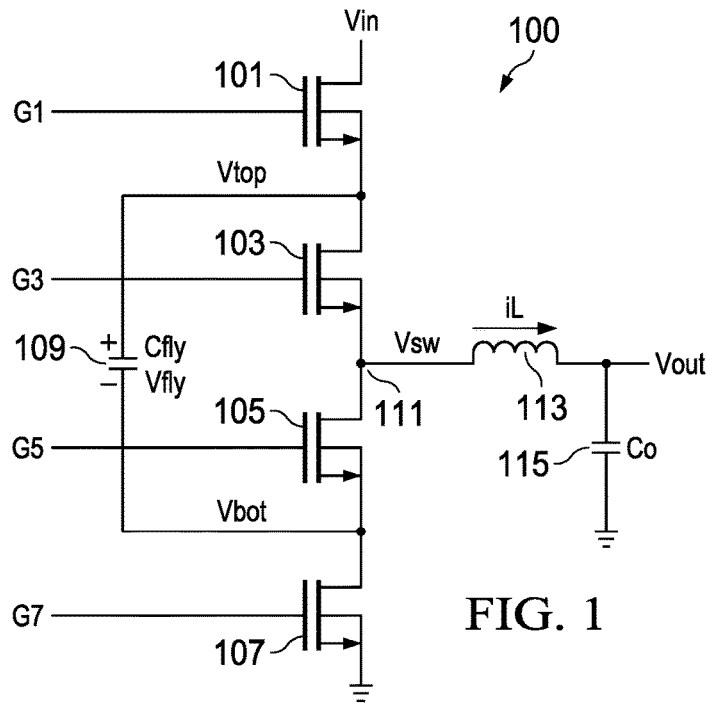
FIG. 1 is a simplified circuit diagram of an example three-level switching power supply circuit.

FIG. 1 is a simplified circuit diagram of an example three-level switching power supply circuit 100. In the example of FIG. 1 the line labeled Vin in FIG. 1 is coupled to the drain terminal of the transistor 101 of FIG. 1. The line Vin is also coupled to a voltage supply that is external to FIG. 1 and not described herein for simplicity of explanation. In an example application, Vin can be coupled to a DC voltage supply that is greater than the desired output voltage Vout. In another alternative application further described hereinbelow, Vin can be coupled to a DC voltage that is less than the desired output voltage Vout. The source terminal of transistor 101 of FIG. 1 is coupled to the node labeled Vtop in FIG. 1. The node Vtop in FIG. 1 is also coupled to the drain of transistor 103 of FIG. 1 and to the top plate of capacitor 109 in FIG. 1 labeled "Cfly." As is further described hereinbelow, the flying capacitor Cfly is selectively coupled between node Vsw and Vin, and also selectively coupled between node Vsw and ground, depending on the mode of operation of the circuit 100, and thus the capacitor Cfly "flies" from one connection arrangement to another connection arrangement during the operation of the circuit 100 in FIG. 1. The source of transistor 103 of FIG. 1 is coupled to the switching node (111 in FIG. 1) labeled Vsw in FIG. 1 and to the drain of transistor 105 of FIG. 1. The source of transistor 105 of FIG. 1 is coupled to the node labeled Vbot in FIG. 1. The node Vbot in FIG. 1 is also coupled to the drain of transistor 107 of FIG. 1 and to the bottom plate of capacitor Cfly (109 in FIG. 1). The source of transistor 107 of FIG. 1 is coupled to ground. The voltage of the top plate of capacitor Cfly (109 of FIG. 1) with respect to the bottom plate of the capacitor Cfly is labeled "Vfly" in FIG. 1. The voltage Vfly of FIG. 1 is positive when the voltage of the top plate of capacitor Cfly (109 of FIG. 1) exceeds the voltage of the bottom plate of capacitor Cfly. A controller (not shown in FIG. 1, for clarity) controls the on and off state of the transistors 101, 103, 105, 107 by applying control voltages to the terminals G1, for transistor 101, G3, for transistor 103, G5, for transistor 105, and G7, for transistor 107. By switching these transistors on and off, the voltage at the switching node Vsw, and the current iL, can be controlled to maintain the output voltage Vout at a desired output voltage. The output inductor 113 and the output capacitor labeled Co (115 in FIG. 1) act as an LC filter circuit to remove unwanted ripple from the DC output voltage Vout that would otherwise occur as the transistors switch. The controller may have a switching frequency of up to several MHz, so that the output voltage is constantly being regulated to a desired level.

In the example of FIG. 1 the switching node (111 in FIG. 1) is also coupled to one terminal of an inductor (113 of FIG. 1). The other terminal of inductor (113) is coupled to the node labeled Vout in FIG. 1. The node Vout in FIG. 1 is also coupled to one plate of the capacitor 115 of FIG. 1. The other plate of the capacitor 115 of FIG. 1 is coupled to ground. The node Vout is the output of the power supply circuit 100 of FIG. 1 and is coupled to a load external to FIG. 1. This load, not described herein, is a circuit being powered by the conventional power supply coupled to line Vin in FIG. 1. In an example application, the load may be a battery that is to be charged. Portable devices that are increasingly used including cellphones, smartphones, tablets, portable computers, portable data entry terminals and portable card readers and portable sales terminals often feature a rechargeable battery.

The three level switching converter circuit 100 of FIG. 1 is implemented to output a specific approximately constant voltage on the output Vout. The switching converter illustrated in FIG. 1 outputs voltage Vout within a specific range of output current. In the example of FIG. 1 the switching converter is implemented such that the voltage on the node Vout is less than the voltage on the line Vin. However, in additional examples, the three-level switching converter can be rearranged to operate in a boost mode, to output a voltage that is greater than the input voltage. An example boost arrangement is described hereinbelow. In one operating mode (the "high voltage" mode), the circuit of FIG. 1 outputs a voltage Vout that is greater than approximately one-half the input voltage Vin. In another operating mode (the "low voltage" mode), the circuit of FIG. 1 outputs a voltage Vout that is less than approximately one-half the input voltage Vin. For a three-level converter implemented to output different voltage levels on Vout at different times, the description herein of FIG. 1 is applicable the voltage level being output on the line Vout at a specific time.

In FIG. 1, transistors 101, 103, 105, and 107 are used as switches. The term "on" as used herein in reference to a transistor refers to a transistor in the Ohmic region of operation, conducting current with little resistance between the source and drain. The term "off" as used herein in reference to a transistor refers to a transistor in a state such that there is approximately no current conduction between the drain and source. The transistors illustrated in FIG. 1 are drawn as field effect transistors (FETs); however three-level converters may be implemented with other types of transistors. Power FET devices such as vertical and lateral DMOS transistors and NexFET™ power devices commercially available from Texas Instruments Incorporated can be used; other MOSFET transistors and other transistor types can also be used to implement transistors 101, 103, 105 and 107.

In operation, the three level converter of FIG. 1 initially powers up to a condition where the voltage Vfly in FIG. 1 is approximately one-half of the voltage on the line Vin in FIG. 1. Also after power up, the voltage on the line Vout of FIG. 1 is approximately the output voltage for which the power supply is implemented. The power up operation is not further described herein for simplicity of explanation.

When a power up operation is complete, the example three-level power supply 100 of FIG. 1 repeatedly cycles through four states. These states are described herein as the "first," "second," "third," and "fourth" states. In a cycle of operation, the circuit 100 begins in the first state, and the remaining states occur in the following sequence: second state, third state, and fourth state. This cycle repeats when circuit 100 transitions from the fourth state to the first state, and continues.

The four states for the three-level power supply illustrated in FIG. 1 operating in the low voltage mode are now described. As the example arrangement of FIG. 1 cycles through these four states, the voltage at the switching node Vsw (111 in FIG. 1) alternatively transitions between voltages approximately equivalent to one-half the voltage Vin of FIG. 1 and ground. In the first state, transistors 101 and 105 of FIG. 1 are on and transistors 103 and 107 of FIG. 1 are off, and corresponding voltages are placed on the gate terminals G1, G5 to turn on 101, 105. In the first state, a conduction path exists through transistor 101 between the top plate of the capacitor Cfly (109) and the external voltage supply coupled to the line Vin. Also in the first state a conduction path exists through transistor 105 between the bottom plate of Cfly (109) and the switching node (111). In the first state the voltage at the switching node (111) is approximately equivalent to the voltage Vin of FIG. 1 reduced by the voltage Vfly of FIG. 1. As described hereinabove the voltage Vfly of FIG. 1 is approximately one-half of the voltage on the line Vin of FIG. 1. Thus the voltage of the switching node (111) in the first state is also approximately one-half the voltage on the line Vin of FIG. 1. In this first state the charge on capacitor Cfly increases.

In the second and fourth states, transistors 105 and 107 of FIG. 1 are on, and transistors 101 and 103 of FIG. 1 are off. Corresponding gate voltages are placed on signal G5, G7 to turn on transistors 105 and 107. In the second and fourth states, a conduction path between switching node Vsw (111) and ground exists through transistors 105 and 107. Thus the voltage Vsw of the switching node (111) is approximately zero in these two states. In the third state transistors 103 and 107 are on, and transistors 101 and 105 are off. Corresponding gate voltages are placed on gate signals G3, G7 to turn on transistors 103, 107. In the third state, a conduction path exists between the top plate of Cfly (109) and the switching node (111) through transistor 103. Also in the third state, a conduction path exists between the bottom plate of Cfly (109) and ground through transistor 107. In the third state the voltage at the switching node (111) is approximately equivalent to the voltage Vfly of FIG. 1. Thus the voltage of the switching node (111) is approximately equivalent to one-half the voltage on the line Vin of FIG. 1. In the third state the charge on Cfly (109 of FIG. 2) decreases.

The four states for the three-level power supply illustrated in FIG. 1 operating in the high voltage mode are now described. As the example of FIG. 1 cycles through these four states, the voltage Vsw at the switching node (111 of FIG. 1) alternatively transitions between voltages approximately equivalent to one-half the voltage Vin and the voltage Vin of FIG. 1. The functionality of the first and third states of the high voltage mode are approximately equivalent to the functionality of the first and third states respectively of the low voltage mode described hereinabove. In the second and fourth states, transistors 101 and 103 of FIG. 1 are on, and transistors 105 and 107 of FIG. 1 are off. Corresponding voltages are placed on gate signals G1, G3 to turn on transistors 101, 103. In the second and fourth states of the high voltage mode, a conduction path exists through transistors 101 and 103 between the switching node (111) and the external voltage supply coupled to the line Vin. Thus in the second and fourth states the voltage of the switching node (111) is approximately equivalent to the voltage on the line Vin of FIG. 1. In the high voltage mode the power supply cycle repeats when the fourth state transitions to the first state and continues.

In both modes of operation, the voltage Vout in FIG. 1 is regulated by adjusting the ratio of the sum of elapsed time in the first and third states to the sum of elapsed time in the second and fourth states. That is, the output voltage is proportional to a duty cycle of the switching operations, where the duty cycle is the average of the fraction of the cycle time that switch 101 is on and the fraction of the cycle time that switch 103 is on. The control circuit that performs this regulation function is not illustrated in FIG. 1 and is not further described herein for simplicity of explanation. The three-level power supply illustrated in FIG. 1 includes a circuit that prevents the establishment of unintended conductions paths such as a high current path between the line Vin and ground through the transistors 101, 103, 105, and 107. This circuit is also not described herein for simplicity of explanation. Additional circuits often included in a power supply such as voltage sensing, current sensing, over voltage protection, high current protection, reference voltage generation, and transistor gate drive are not described herein for simplicity of explanation.

As described hereinabove, the voltage Vsw of the switching node (111 of FIG. 1) transitions between two voltages during each cycle of operation of circuit 100 of FIG. 1. One of these voltages is approximately equivalent to one-half the input voltage Vin of FIG. 1. The other voltage is either approximately ground or approximately the input voltage Vin of FIG. 1. The circuit formed by the inductor (113 of FIG. 1) and the capacitor (115 of FIG. 1) maintains an approximately fixed voltage on the output Vout of FIG. 1 while the voltage of the switching node (111) Vsw undergoes the transitions between these two voltages.

As described hereinabove, charge is increased on the flying capacitor Cfly (109 of FIG. 1) during the first state in a cycle of operation and charge is reduced in the third state. Three-level power supplies such as shown in FIG. 1 can be implemented such that these charge increases and decreases are small, resulting in a small amount of ripple on the voltage Vfly of FIG. 1. A three-level power supply can be implemented such this voltage ripple is within a sufficiently small range that the power supply operates as intended for a specific application. The differential flying capacitor voltage Vfly is then an approximately constant DC voltage.

Figure 2A:
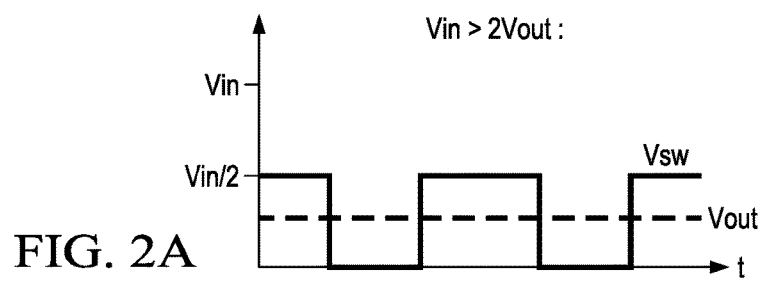
FIGS. 2A and 2B are timing diagrams for two modes of operation of the three-level switching power supply circuit of FIG. 1.
Figure 2B:
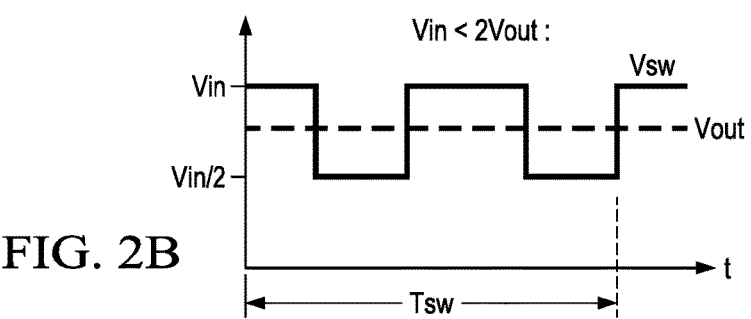

FIGS. 2A and 2B illustrate in timing diagrams the output voltage and the switching node voltage for the high voltage and low voltage modes, respectively. The low voltage mode, where the switching node voltage Vsw transitions between half the input voltage Vin and the ground voltage, is shown in FIG. 2A. The high voltage mode, where the switching node voltage Vsw transitions between one half Vin and the input voltage Vin, is shown in FIG. 2B. As shown in both modes, in a single period labeled Tsw, the voltage at the switching node Vsw transitions as the three level converter moves through the four states. The output voltage Vout is maintained at a more or less steady DC level at a determined voltage as shown in both FIG. 2A and FIG. 2B.

Figure 3A:
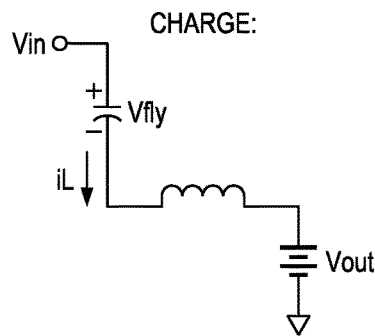
FIGS. 3A and 3B are simplified circuit diagrams illustrating flying capacitor charge/discharge configurations of a three-level switching converter.
Figure 3B:
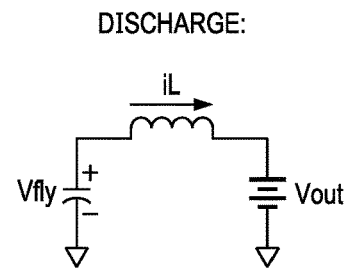

FIGS. 3A and 3B illustrate the charge and discharge connectivity of the capacitor Cfly in a three level switching converter such as 100 in FIG. 1. In FIG. 3A, the switches such as the FETs 101, 103, 105, 107 in FIG. 1 are configured to couple the top plate of the flying capacitor to the input voltage on the line Vin, and the bottom plate is coupled to the switching node Vsw. In the charge configuration, the flying capacitor is coupled so that the input voltage is divided between the input voltage and the output voltage.

The capacitor Cfly is charged by the current flowing into the inductor iL. In FIG. 3B the capacitor is used to supply current to the inductor and to the output terminal, and in this state the capacitor Cfly discharges.

Figure 4:
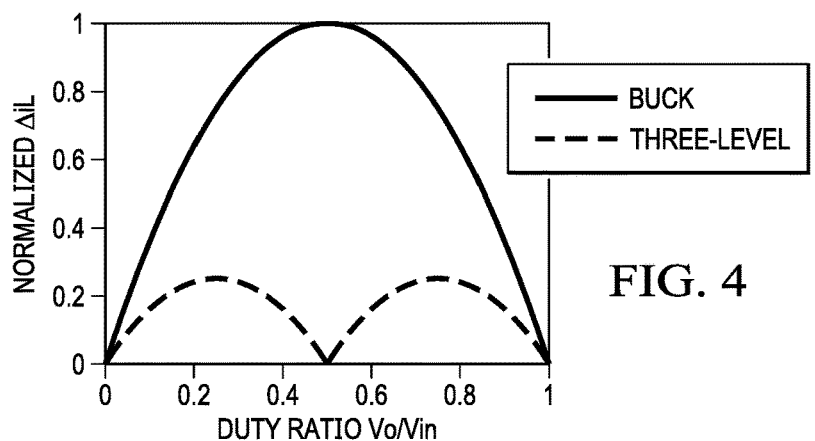
FIG. 4 is a graph of current ripple plotted against the duty ratio for a buck converter and three-level switching converter assuming equal switching frequency and inductance.

FIG. 4 illustrates in a comparison graph the inductor current ripple ΔiL for a two level buck converter and for a three level switching converter such as shown in FIG. 1. In FIG. 4, the change in inductor current ripple over a range of duty ratio values for an output voltage Vo over an input voltage Vin. As shown in FIG. 4, when the duty ratio is approximately 50 percent, the buck converter inductor current ripple peaks. In FIG. 4, this current ripple peak is normalized to 1 at the maximum point. In FIG. 4, the three level converter current ripple is plotted using the normalized inductor current as 1, and as shown in FIG. 4, the current ripple for the three level converter has a peak about 25% of the buck converter current ripple peak, and the peaks occur at different duty ratios, at about 25% and 75%. Use of the three level switching converter enables a lower inductor current ripple and thus allows the use of smaller components including the use of a smaller inductor, which is often a large component and can be the largest component on a circuit board.

Figure 5:
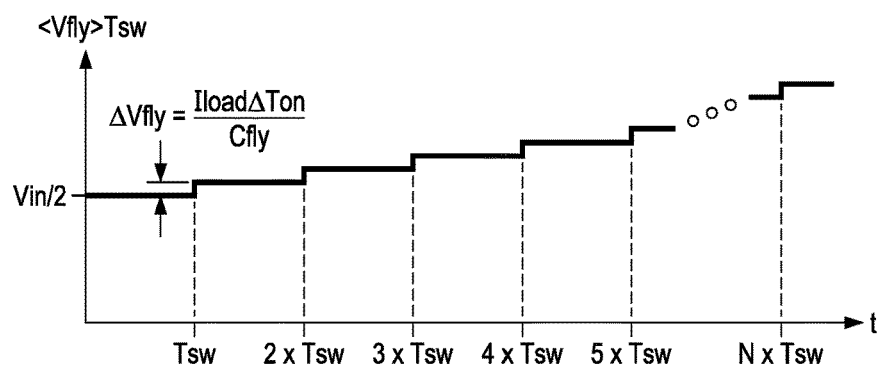
FIG. 5 is a timing diagram showing a charge/discharge timing error in a three level converter.

FIG. 5 illustrates in a timing diagram an example of voltage drift in the voltage Vfly for a three level converter such as shown in FIG. 1. FIG. 5 shows the effect of a slight difference in timing of the charge and discharge modes of the operation of the three level converter. A slightly longer charge time results in a slight change in Vfly in each cycle Tsw. This difference in timing can occur due to slight differences in the physical performance of individual transistors, for example. Over several cycles, the voltage Vfly can increase (or decrease) each cycle. Because the operation of the three level converter retains the extra charge in each cycle, the error accumulates. As shown in FIG. 5, over several cycles, the flying capacitor voltage Vfly between the top plate and the bottom plate of the flying capacitor Cfly in FIG. 1, for example, can increase substantially resulting in an erroneous or improper operation.

Figure 6:
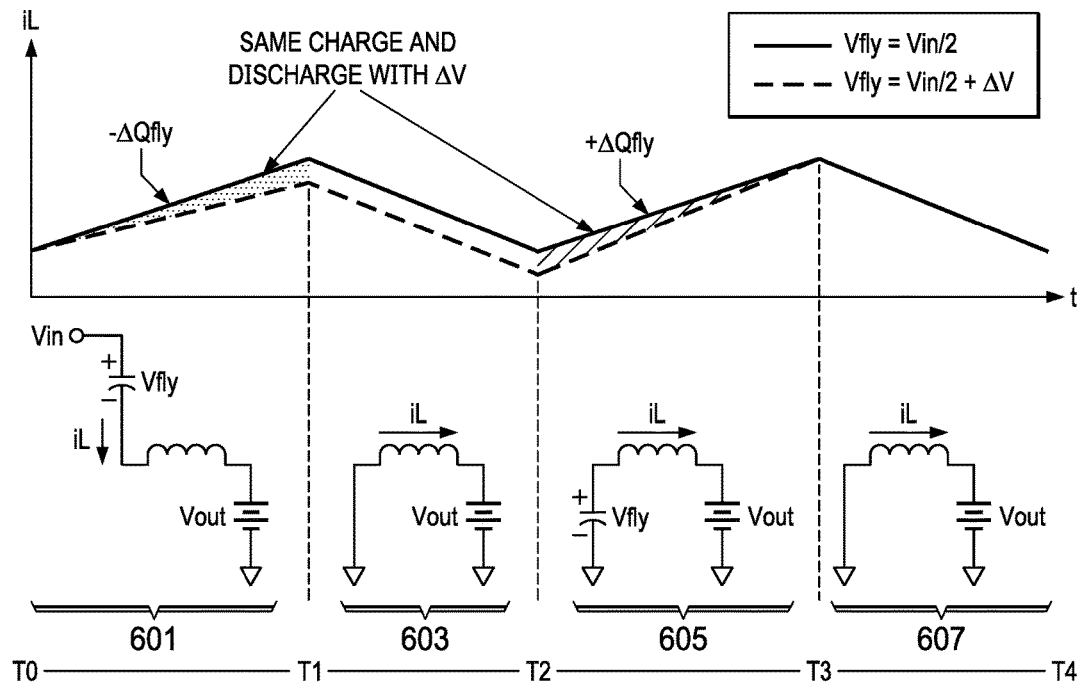
FIG. 6 is a graph of current versus time and corresponding simplified circuit diagrams for the operation of a three-level converter.

FIG. 6 is a graph of the inductor current iL plotted against time t for four states of operation used by the three level converter. The simplified circuit diagrams below the graph show the connectivity of the switching node and the flying capacitor in each state. In FIG. 6, during the time between time T0 and T1, the input voltage on line Vin is divided between the flying capacitor (voltage Vfly is taken from the top plate to the bottom plate of the flying capacitor) and the output node Vout as shown by circuit diagram 601. Vfly should be Vin/2, and that line is plotted as a solid dark line in the timing graph. During this mode, the transistors or switches configure the top plate of the flying capacitor to be directly coupled to the input voltage while the bottom plate of the flying capacitor is coupled to the switching node Vsw, and the current iL flows through the flying capacitor and through the inductor to supply the load shown as Vout. In this example the load is shown as a battery. During the time period between T0 and T1, the flying capacitor is charged to a voltage Vfly. In the diagram, the effect of an error in the switch timing, which results in a delta voltage ΔV, is shown. The current iL for the error case of a capacitor voltage Vfly greater than Vin/2 is plotted as a dashed line. In the charge mode, between time T0 and T1, the difference between the two cases is shown as a negative charge offset −ΔQfly.

During the time between T1 and T2, circuit diagram 603 shows that the flying capacitor Cfly in FIG. 1 is not coupled to the switching node, and the output node Vout is supplied with current iL from energy stored in the inductor. The inductor current falls as the energy is used to provide the current to the load at the output, Vout. Between times T2 and T3, the flying capacitor voltage Vfly is used to supply the load in a discharge mode. In this mode, the top plate of the flying capacitor is coupled to the switching node Vsw in FIG. 1, and the bottom plate of the capacitor is coupled to ground so that the flying capacitor acts as a battery with voltage Vfly. As shown in the timing diagram the inductor current iL increases during the discharge mode as energy is supplied to the inductor. During this time, the delta charge offset is shown, now shown as a positive difference+ΔQfly.

During time between time T3 and time T4, circuit diagram 607 shows the flying capacitor is not coupled to the switching node, and the inductor supplies current iL to the load at the output node Vout.

The "cyclic charge offset" is the charge decrease (a negative number) occurring in the third mode of the operating cycle summed with the charge increase (a positive number) in the first mode in FIG. 6. Differences in the duration of the first and third states and other circuit characteristics can result the cyclic charge offset being positive for multiple operating cycles, or negative for multiple operating cycles. For such cases, the voltage Vfly of FIG. 1 can drift from the intended voltage (approximately equivalent to one-half the voltage on the line Vin of FIG. 1). Adjusting the time duration of the first and third states such that cyclic charge offset is approximately zero can reduce subsequent voltage drift. However, such an adjustment is not sufficient to correct the voltage Vfly of FIG. 1 to again be approximately equivalent to one-half the voltage on the line Vin of FIG. 1. As shown in FIG. 6, the cyclic charge offset remains in the circuit through the four states.

FIG. 6 illustrates that even if the switch timing is perfect, that is, the charge time perfectly equals the discharge time, there is no restorative action that will bring Vfly back to Vin/2 after an error occurs. This is shown in FIG. 6 because the reduction in charging in the charge time from T0-T1 is equal to the reduction in discharging during time T2-T3, and the capacitor voltage doesn't change from cycle to cycle. The cyclic charge offset error will remain on the flying capacitor over time.

An approach for maintaining the voltage Vfly of FIG. 1 at the intended voltage of one-half the voltage on line Vin is to implement the three level converter power supply of FIG. 1 with two control loops. In this approach, one control loop regulates the voltage Vfly of FIG. 1 by modulating the elapsed time of the first state relative to the elapsed time of third state. The second control loop modulates the ratio of the total elapsed time of the first and third states and the total elapsed time of second and fourth states. For both of these control loops to operate simultaneously, the three level converter example of FIG. 1 is often implemented with slow control loop response times. Slow control loop response times can result in disadvantageous functional characteristics such as excessive delays in response to changes to the supply voltage on the line Vin. That is, the circuitry with two control loops is transient sensitive with respect to the input voltage Vin.

Another approach that can operate without the disadvantage of slow control loop response is the "valley current mode" control method. However, this control approach is limited to three-level power supply implementations where the input voltage Vin of FIG. 1 and the output voltage Vout of FIG. 1 are not similar. A power supply implemented such that the input and output voltages are typically not similar, may, however, temporarily experience input voltage Vin reductions such that valley current mode control is not effective. The valley current mode control method is described in D. Reusch, F. C. Lee, and M. Xu, "High frequency, high power density integrated point of load and bus converters," Virginia Tech PhD Dissertation, 2012.

Figure 7A:
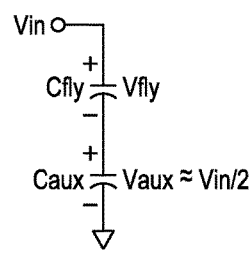
FIGS. 7A and 7B are circuit diagrams for two configurations of a switched capacitor voltage divider.
Figure 7B:
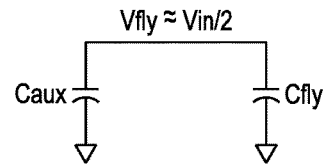

FIGS. 7A and 7B illustrate an arrangement for dividing an input voltage equally using a switched capacitor circuit. In FIG. 7A, two capacitors, a flying capacitor Cfly and an auxiliary capacitor Caux are initially placed in series. The series capacitors act as a voltage divider so that the two capacitors should end up with voltage Vin/2 stored on each capacitor. In FIG. 7B the parallel configuration is shown. With the two capacitors Cfly and Caux coupled in parallel, the top plates of the two capacitors are coupled together and the voltage stored on the capacitors necessarily becomes equal. By switching between the series and parallel configurations of FIGS. 7A and 7B, over a few cycles the voltage Vin is equally divided between the two capacitors and the voltage Vfly is also regulated to Vin/2.

Figure 8:
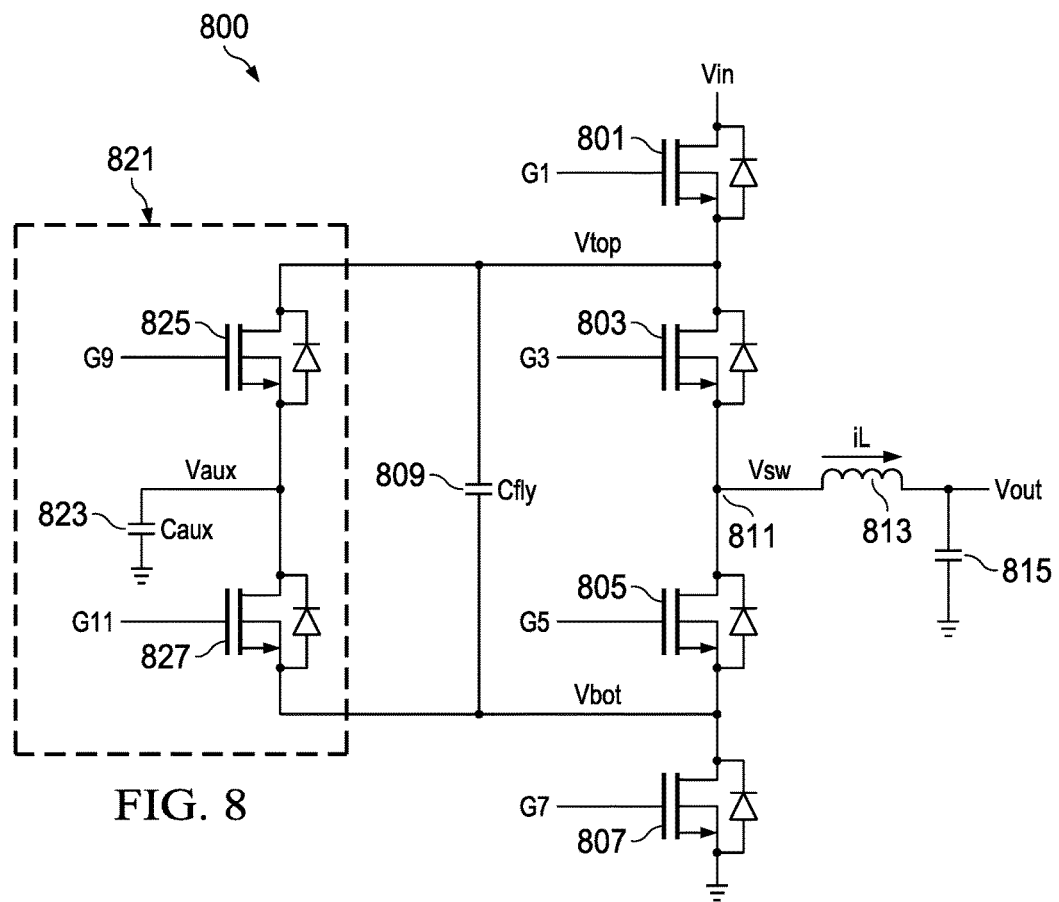
FIG. 8 is a circuit diagram for an example arrangement for a three-level converter including an auxiliary capacitor.

FIG. 8 is a circuit diagram for a three-level converter arrangement 800 including a switched capacitor voltage divider to regulate the flying capacitor voltage Vfly. In FIG. 8, transistors 801 with gate G1, 803 with gate G3, 805 with gate G5, 807 with gate G7, inductor 813, output capacitor 815, and the flying capacitor Cfly (809) form a three level switching converter similar to the three level converter 100 in FIG. 1. In addition an auxiliary circuit 821 includes switches in the form of transistors 825 with gate G9, 827 with gate G11, and the auxiliary capacitor Caux.

In operation, the three level converter arrangement 800 includes a switched capacitor voltage divider formed with Cfly and Caux. By operating the capacitor voltage divider at the same time as the three-level converter, the voltage across the flying capacitor 809, Vfly, can be regulated to the level Vin/2 and can be maintained at the Vin/2 voltage over each cycle. A controller (not shown) provides appropriate gate signals to gate terminals G1. G3, G5, G7, G9 and G11 to operate the three-level converter to obtain a desired output voltage at the node Vout.

Figure 9A:
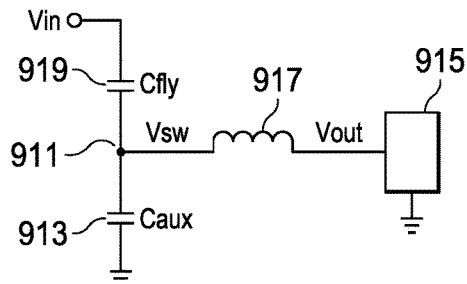
FIGS. 9A-9D are simplified circuit diagrams for selected operations of an example three-level switching converter.

FIGS. 9A-9D illustrate the operation of a three level converter arrangement including an auxiliary capacitor in a switched capacitor topology, such as shown in FIG. 8. In FIG. 9A, the circuit is shown arranged in a "charge" operation where the top plate of the flying capacitor Cfly (919) is coupled to the input voltage at Vin, the bottom plate of the flying capacitor Cfly 919 is coupled to the switching node Vsw (911), the auxiliary capacitor Caux (913) is coupled between the switching node 911 and a ground terminal. In the first state, the input voltage is divided between the flying capacitor Cfly and the auxiliary capacitor Caux and the capacitors are charged to the voltage Vin/2.

Figure 9B:
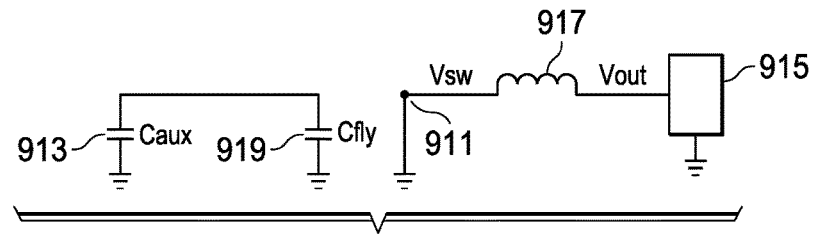

In FIG. 9B, the circuit is shown arranged for operation in the second and fourth states for a "low voltage" converter where the output voltage is less than half the input voltage. In FIG. 9B, the switching node 911 is coupled to ground. The inductor 917 supplies current to the output node Vout and to the load 915 (the load 915 includes the output capacitor in FIGS. 9A-9D). The switches (see transistors in FIG. 8) can then be arranged to couple the auxiliary capacitor Caux and the flying capacitor Cfly in parallel, as also shown in FIG. 9B.

Figure 9C:
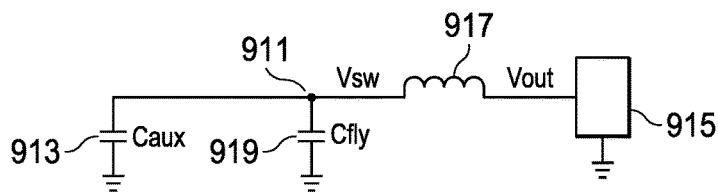

In FIG. 9C, the circuit is shown arranged for operation in the third state, the "discharge" state, for both high voltage and low voltage converter cases. In FIG. 9C, the flying capacitor Cfly (919) and the auxiliary capacitor Caux (913) are coupled in parallel and have the top plates of each capacitor coupled together, ensuring that each capacitor will have an equal voltage Vin/2. The capacitors are also coupled to the switching node 911, and the capacitors supply current to the inductor 917 and the load 915. The capacitors discharge in the third state, providing current to the load 915 coupled at the node Vout.

Figure 9D:
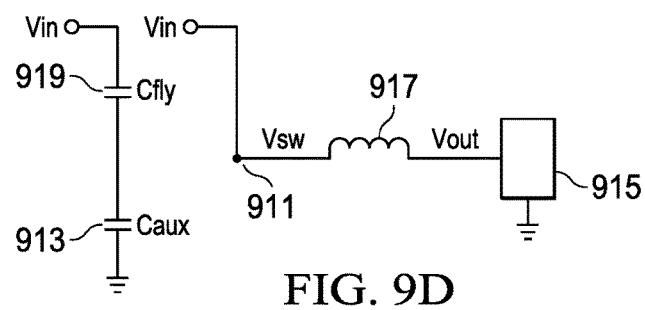

In FIG. 9D, the circuit is shown arranged for the second and fourth states for a high voltage converter case where the output voltage is greater than half the input voltage. In FIG. 9D, the input voltage Vin is coupled directly to the switching node Vsw (911). The switching node voltage Vsw is coupled to Vin and is supplying current through an inductor 917 and to the load 915 at the output node Vout. The capacitors Cfly and Caux are not coupled to the switching node 911 but the switches can be arranged so that the two capacitors are coupled serially to the input voltage Vin, and thus divide the voltage Vin between the two series capacitances as described hereinabove.

In the example arrangements, the auxiliary capacitor and the flying capacitor are used in a switched capacitor voltage divider operation that operates in parallel with the three level converter operations. The circuit operates so that the flying capacitor Cfly voltage Vfly is set to the input voltage Vin divided by two. In the example arrangements the operation of the three level converter is not affected by the added circuitry for the auxiliary capacitor. By maintaining the voltage Vfly at Vin/2 throughout the operations, the offset charge such as shown in FIG. 6 is avoided. Further, in the arrangements the control of the gate signals for the switches associated with the auxiliary capacitor, such as G9 and G11 in FIG. 8, can be operated simultaneously with the gate signals G7, G1 respectively so that no additional control logic is needed to operate the auxiliary capacitor for the voltage divider.

Figure 10:
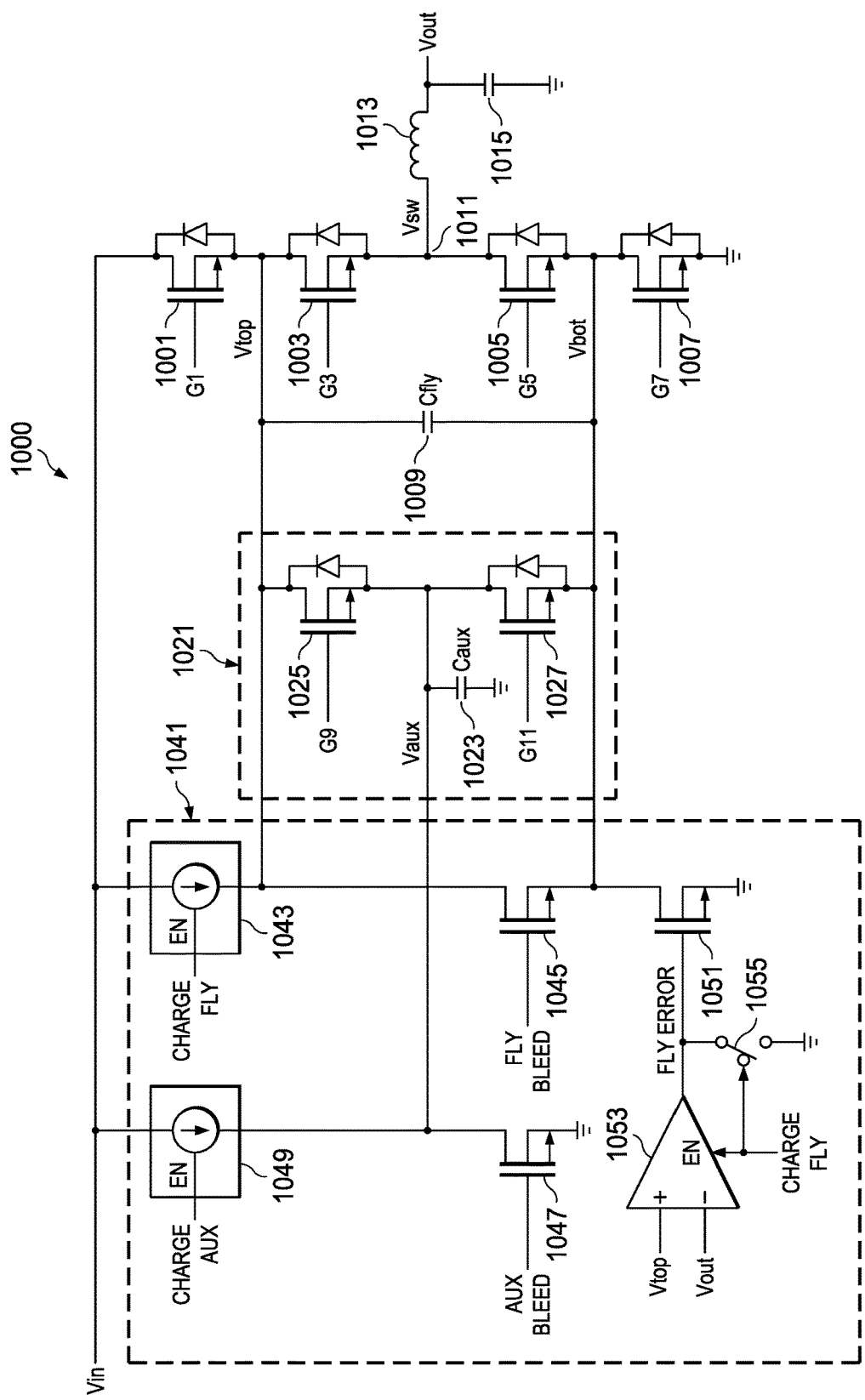
FIG. 10 is a circuit diagram for an additional example three-level converter.

FIG. 10 is a circuit diagram of an example arrangement of a three-level power supply circuit 1000. Circuit 1000 includes a group of circuits 1021 that correspond to the circuit 821 in FIG. 8. This group of circuits 1021 is a portion of a switched capacitor voltage divider circuit that maintains the voltage across the capacitor Cfly (1009) at a level approximately equivalent to one-half of the input voltage as described hereinbelow. When the voltage across Cfly 1009 is maintained at a level approximately equivalent to one-half the input voltage Vin, the charge increase on Cfly (1009) in one switching state is considered balanced with respect to a charge decrease in a subsequent switching state. Circuit 1000 also includes the group of circuits 1041 that is used when circuit 1000 begins operation. The group of circuits 1041 of FIG. 10 pre-conditions the charge on the capacitors Caux and Cfly (1023 and 1009 respectively of FIG. 10) with little disturbance of the output voltage Vout of circuit 1000 as described hereinbelow.

In the example of FIG. 10 the line labeled Vin is coupled to the drain of the transistor 1001. The line Vin is also coupled to a voltage supply that is external to FIG. 10 and not described herein for simplicity of explanation. The source terminal of transistor 1001 is coupled to the node labeled Vtop. The line Vtop is also coupled to the drain terminal of transistor 1003 and to the top plate of capacitor Cfly (1009 in FIG. 10). The source of transistor 1003 is coupled to the switching node (1011), the line labeled Vsw and to the drain of transistor 1005. The source of transistor 1005 of FIG. 10 is coupled to the line labeled Vbot. The line Vbot is also coupled to the drain of transistor 1007 of FIG. 10 and to the bottom plate of capacitor Cfly (1009). The source of transistor 1007 of FIG. 10 is coupled to ground.

In the example of FIG. 10 the switching node Vsw is also coupled to the one terminal of the inductor (1013). The other terminal of inductor 1013 is coupled the line labeled Vout.

The line Vout is also coupled to one plate of capacitor 1015 of FIG. 10. The other plate of capacitor 1015 is coupled to ground. The line Vout is the output of the power supply circuit 1000 of FIG. 10 and is coupled to a load external to FIG. 10 (not shown). This load, not described herein, is a circuit being powered by the example arrangement of FIG. 10. In an application the load is a rechargeable battery.

In FIG. 10 the drain of transistor 1025 and the output of the current source 1043 are coupled to the line Vtop. The line Vtop is also coupled to the drain of transistor 1045. The source terminals of transistors 1027 and 1045 of FIG. 10 are coupled to the line Vbot. The line Vbot is also coupled to the drain of transistor 1051 in FIG. 10. The top plate of capacitor Caux (1023) in FIG. 10 is coupled to the line Vaux. The line Vaux is also coupled to the source of transistor 1025 and to the drain terminals of transistors 1027 and 1047 of FIG. 10. The output of current source 1049 of FIG. 10 is coupled to the line Vaux. The bottom plate of capacitor Caux (1023) is coupled to ground. The source terminals of transistors 1047 and 1051 of FIG. 10 are coupled to ground. The inputs of the current sources 1043 and 1049 of FIG. 10 are coupled to the line Vin. The enable input (EN) of current source 1043 is coupled to the line labeled "CHARGE FLY" in FIG. 10. The positive and negative inputs of the error amplifier 1053 of FIG. 10 are coupled to the lines Vtop and Vout respectively. The enable input (EN) of the error amplifier 1053 is coupled to the line charge fly in FIG. 10. The line charge fly in FIG. 10 is also coupled to the control input of the switch 1055. The line labeled "FLY ERROR" in FIG. 10 is coupled to the following circuit elements: the output of the error amplifier 1053; the gate of transistor 1051; and to one terminal of the switch 1055. The other terminal of the switch 1055 is coupled to ground. The switch 1055 can be implemented with a transistor or other type of component. The switch 1055 operates such that it is open when the signal on the line charge fly of FIG. 10 is a logic high. The switch 1055 is closed when the signal on the line charge fly of FIG. 10 is a logic low. When the switch 1055 is closed a path between the gate of transistor 1051 and ground is established. The source to drain body diodes are included in the drawing symbols used in FIG. 10 for the transistors 1001, 1003, 1005, 1007, 1025, and 1027 of FIG. 10.

The lines coupled to the gate terminals G1, G3, G5, G7, G9 and G11 of transistors 1001, 1003, 1005, 1007, 1025, 1027, and the gate signals for transistors 1045 (labeled "AUX BLEED"), and 1047 (labeled "FLY BLEED") of FIG. 10 are provided by a control circuit. This control circuit is not illustrated in FIG. 10 for simplicity of explanation.

The current sources 1043 and 1049 of FIG. 10 operate such that when the signal on the enable input (the terminals labeled EN in 1043 and 1049 of FIG. 10) is a logic high, the respective current source is enabled. When the signal on the EN terminal is a logic low the respective current source is disabled. When disabled, the output of the current source (1043 or 1049 of FIG. 10) is high impedance with approximately no effect on the voltage present on the line coupled to the output (Vtop or Vaux, respectively, of FIG. 10).

When the signal on the line CHARGE FLY of FIG. 10 is a logic high, the error amplifier 1053 is enabled. When enabled, the error amplifier 1053 outputs a voltage on the line FLY ERROR of FIG. 10 that drives the gate of transistor 1051 to regulate Vtop to Vout. When the error amplifier 1053 is disabled, its output (coupled to the line FLY ERROR in FIG. 10) is high impedance.

The transistors illustrated in FIG. 10 are used as switches. The transistor 1051 in FIG. 10 is also used in the saturation region of operation as described hereinbelow. The term "on" as used herein in reference to a transistor refers to a transistor in the ohmic region, conducting current with little resistance between the source and drain. The term "off" as used herein in reference to a transistor refers to a transistor in a state such that there is approximately no conduction between the drain and source through the transistor channel (however, source to drain conduction is possible through a forward biased body diode that is inherent in transistors, the body diodes are shown in FIG. 10). The transistors illustrated in FIG. 10 are shown implemented as n-channel metal oxide semiconductor field effect transistors (MOSFETs). Alternative arrangements can be implemented using other types of transistors and circuit elements with corresponding changes to circuit 1000 of FIG. 10.

The example arrangement of FIG. 10 supplies power to a circuit external to FIG. 10 coupled to the line Vout. The term "normal operation" is used herein in reference to this function of supplying power to an external circuit.

Before normal operation begins, such as during power up of the example arrangement of FIG. 10, an initialization function is performed referred to herein as "pre-conditioning." Both normal operation and pre-conditioning are described hereinbelow.

The example arrangement of FIG. 10 is implemented to output a specific approximately constant voltage on the line Vout during normal operation. The example arrangement of FIG. 10 is implemented to output this voltage within a specific range of output current. The output voltage and current range depend on the implementation of the example arrangement for a specific application. In the example of FIG. 10 the example arrangement is implemented such that the voltage on the line Vout is maintained at a level less than the voltage on the line Vin. The voltage on the line Vin is approximately fixed. However, the example arrangement can be implemented to operate as intended with variations of this voltage within specific limits. These limits depend on the implementation of the example arrangement for a specific application and are not described herein.

Normal operation of the example of FIG. 10 is performed in one of two modes. In one of these two operating modes (the "high voltage" mode), the output voltage on the line Vout of FIG. 10 is greater than approximately one-half the voltage on the line Vin of FIG. 10. In the other operating mode (the "low voltage" mode), the output voltage on the line Vout of FIG. 10 is less than approximately one-half the voltage on the line Vin of FIG. 10. Either the high voltage mode or the low voltage mode can be used when the power supply output voltage (the voltage on the line Vout of FIG. 10) is approximately equivalent to one-half the voltage on the line Vin of FIG. 10. In an example, when Vout is equal to Vin/2, the circuit operates in a combination of both modes. For an example arrangement implemented with a variable output voltage, the description herein of FIG. 10 is applicable the voltage level being output on the line Vout at a specific time. An example arrangement with a variable output voltage is not described herein for simplicity of explanation.

When pre-conditioning is complete and normal operation begins, the voltage across Cfly (1009 in FIG. 10) and the voltage on the line Vaux in FIG. 10 are both approximately equivalent to one-half of the voltage on the line Vin in FIG. 10. Pre-conditioning is further described hereinbelow. During normal operation the on and off conditions of transistors 1001, 1003, 1005 and 1007 of FIG. 10 repeatedly cycle through four states as described hereinabove. These states are the "first," "second," "third," and "fourth" states. Such a cycle is referred to herein as the "operating cycle." In an operating cycle, the circuit 1000, begins in the first state, and the remaining states occur in the following sequence: second state, third state, and fourth state. The operating cycle repeats when circuit 1000 transitions from the fourth state to the first state. Alternative arrangements can be implemented where these states occur in a different sequence within an operating cycle.

For the example arrangement of FIG. 10 operating in the low voltage mode described hereinabove, as the operating cycle sequences through these four states, the voltage at the switching node Vsw (1011 of FIG. 10) alternatively transitions between voltages approximately equivalent to one-half the voltage on the line Vin of FIG. 10 and ground. In the first state, transistors 1001 and 1005 of FIG. 10 are on and transistors 1003 and 1007 are off. In the first state, a conduction path exists through transistor 1001 between the top plate of the capacitor Cfly (1009) and the external voltage supply coupled to the line Vin. Also in the first state a conduction path exists through transistor 1005 between the bottom plate of Cfly (1009) and the switching node (1011). As a result, in the first state, the voltage at the switching node (1011) is approximately equivalent to one-half the voltage on the line Vin of FIG. 10. FIG. 9A described hereinabove is a simplified circuit diagram corresponding to the example of FIG. 10 operating in the first state of the low voltage mode. In the second and fourth states, transistors 1005 and 1007 of FIG. 10 are on, and transistors 1001 and 1003 of FIG. 2 are off. In the second and fourth states, a conduction path between switching node (1011) and ground exists through transistors 1005 and 1007. Thus in these two states the voltage of the switching node (1011) is approximately zero (the ground potential). FIG. 9B described hereinabove is a simplified circuit diagram corresponding to the example of FIG. 10 operating in the second and fourth states of the low voltage mode. In the third state transistors 1003 and 1007 are on, and transistors 1001 and 1005 are off. In third state, a conduction path exists between the top plate of Cfly (1009) and the switching node (1011) through transistor 1003. Also in the third state, a conduction path exists between the bottom plate of Cfly (1009) and ground through transistor 1007. As a result, in the third state the voltage at the switching node (1011) approximately equivalent to one-half the voltage on the line Vin of FIG. 10. In the third state charge on Cfly (1009) is reduced, and in the first state charge on Cfly (1009) is increased. FIG. 9C described hereinabove is a simplified circuit diagram corresponding to the example of FIG. 10 operating in the third state of the low voltage mode.

For the example arrangement of FIG. 10 operating in the high voltage mode described hereinabove, as the operating cycle sequences through these four states, the voltage at the switching node (1011 of FIG. 10) alternatively transitions between voltages approximately equivalent to one-half the voltage on the line Vin and the voltage on the line Vin of FIG. 10. In the second and fourth states, transistors 1001 and 1003 of FIG. 10 are on, and transistors 1005 and 1007 of FIG. 10 are off. In the second and third states, a conduction path through transistors 1001 and 1003 exists between the switching node (1011) and the external voltage supply coupled to the line Vin of FIG. 10. Thus the voltage of switching node (1011) is approximately equivalent to the voltage on the line Vin of FIG. 10. FIG. 9D described hereinabove is a simplified circuit diagram corresponding to the example of FIG. 10 operating in the second and fourth states of the high voltage mode. The first and third states of the high voltage mode are approximately equivalent to the first and third states respectively of the low voltage mode described hereinabove. FIGS. 9A and 9C described hereinabove also correspond to the example of FIG. 10 operating in the first and third states respectively of the high voltage mode.

In both the low voltage and high voltage modes of operation, the voltage on the line Vout in FIG. 10 is regulated by adjusting the ratio of the sum of elapsed time in first and third states to the sum of elapsed time in the second and fourth states. The output voltage Vout is thus proportional to the duty cycle of the switching converter. That is, the output voltage is proportional to a duty cycle of the switching operations, where the duty cycle is the average of the fraction of the cycle time that switch 1001 is on and the fraction of the cycle time that switch 1003 is on. This timing adjustment can be accomplished with approaches such as pulse width modulation (PWM) and pulse frequency modulation (PFM). Voltage regulation is not further described herein for simplicity of explanation.

In FIG. 10 capacitor Cfly (1009), transistors 1001 and 1007, and the group of circuits 1021 form a switched capacitor voltage divider circuit. This switched capacitor circuit is used to maintain the voltage across the capacitor Cfly (1009) at a level equivalent to approximately one-half the voltage on the line Vin of FIG. 10. In operation the group of circuits 1021 of FIG. 10 alternatively place the capacitors Caux and Cfly in series and parallel configurations as described hereinabove. Transistor 1025 of FIG. 10 is controlled such it is on at approximately the same time that transistor 1007 of FIG. 10 is on. Transistor 1027 of FIG. 10 is controlled such that it is on at approximately the same time that transistor 1001 of FIG. 10 is on. Thus in the low voltage mode, for the four states of the operating cycle described hereinabove, transistor 1027 is on in the first state, and this transistor is off in the second, third, and fourth states. Also, transistor 1025 is off in the first state, and transistor 1025 is on in the second, third, and fourth states. In the second, third, and fourth states the capacitors Caux (1023) and Cfly (1009) are in the parallel configuration. In the first state the capacitors Caux (1023) and Cfly (1009) are in the series configuration. These configurations are illustrated in FIGS. 9A-C described hereinabove. When the example arrangement of FIG. 10 is operating in the high voltage mode, for the four states of the operating cycle described hereinabove, transistor 1027 is off in the third state, and this transistor is on in the first, second, and fourth states. Also, transistor 1025 is on in the third state, and transistor 1025 off in the first, second, and fourth states. In the first, second, and fourth states the capacitors Caux (1023) and Cfly (1009) are in the series configuration. In the third state the capacitors Caux (1023) and Cfly (1009) are in the parallel configuration. These configurations are illustrated in FIGS. 9A, 9C, and 9D described hereinabove.

Normal operation of the example arrangement of FIG. 10 is controlled by a control circuit that is not illustrated in FIG. 10 for simplicity of explanation. This control circuit performs functions including the following: controls the on and off states (described hereinabove) of transistors 1001, 1003, 1005, 1007, 1025, and 1027 of FIG. 10; compares the voltage on the line Vout of FIG. 10 to a reference voltage; and generates and adjusts PWM or PFM signals to regulate the voltage on the line Vout to be approximately equivalent to a reference voltage. PWM and PFM signals can be used to control the timing for the on-off switching of the transistors 1001, 1003, 1005, 1007, 1025, and 1027 of FIG. 10 using gate signals G1, G3, G5, G7, G9, and G11. The on-off switching of these transistors establishes the transitions between the four states of the low and high voltage modes described hereinabove. The timing of this on-off switching also establishes the amount of time that elapses during these states and thus controls the voltage on the line Vout of FIG. 10. The control circuit may employ control approaches other than PWM or PFM. The control circuit also performs the on-off switching to prevent unintended conduction paths through the transistors 1001, 1003, 1005, 1007, 1025, and 1027 of FIG. 10. For example, so called "cross conduction" (a high current path between the line Vin of FIG. 10 and ground) is prevented by the control circuit by insuring that transistors 1001, 1003, 1005, and 1007 are not all on at the same time.

The example arrangement of FIG. 10 may contain other circuits that perform functions including the following: over voltage protection; output current limiting; high temperature protection; reference voltage generation; transistor gate drive voltage regulation; start up functions (in addition to pre-conditioning); reset of circuit 1000 of FIG. 10 to a known state; generate a "power good" indication; and generate indications of operating faults. These other circuits are not described herein for simplicity of explanation.

The example arrangement of FIG. 10 can be implemented to include a linear voltage regulator used as a power supply for transistor gate drive. To reduce energy consumption, this linear regulator can be powered by the voltage on the line Vaux of FIG. 10 (approximately one-half the voltage on the line Vin) as opposed to being powered by the power supply external to FIG. 10 or coupled to the line Vin of FIG. 10. This linear regulator is not described herein for simplicity of explanation.

As a result of both the series and parallel configurations of capacitors Cfly 1009 and Caux 1023 of FIG. 10 occurring during the operating cycles, the voltages across these capacitors are maintained at an equal level equivalent to approximately one-half the voltage on the line Vin of FIG. 10, as described hereinabove. This voltage level is maintained across these capacitors for a wide range of the ratio of time elapsed in the parallel configuration to the time elapsed in the series configuration. Because the example arrangement of FIG. 10 operates as intended with a wide range of this timing ratio, different control approaches can be used to regulate the voltage on the line Vout of FIG. 10. For example, PWM, PFM, or hysteretic control can be used, as well as other control approaches that are based on voltage or current sensing.

As described hereinabove, the voltage of the switching node (Vsw, 1011 of FIG. 10) transitions between two voltages during the operating cycles. One of these voltages is approximately equivalent to one-half the voltage on the line Vin of FIG. 10. The other voltage is either approximately zero (the ground potential) or approximately the voltage on the line Vin of FIG. 10. While the voltage Vsw of the switching node 1011 undergoes the transitions between these two voltages, the circuit formed by the inductor (1013) and the output capacitor (1015) maintains an approximately fixed voltage on the line Vout of FIG. 10. The operation of this circuit formed by the inductor (1013) and the capacitor (1015) is not further described herein for simplicity of explanation.

Prior to normal operation described hereinabove, pre-conditioning functionality is performed by the example arrangement of FIG. 10. Pre-conditioning is performed as part of the startup operation of circuit 1000 of FIG. 10 such as during power up. Pre-conditioning can also be performed after a fault condition or error condition.

The group of circuits 1041 in FIG. 10 performs a pre-conditioning operation. Pre-conditioning charges or discharges the capacitors Caux 1023 and Cfly 1009 of FIG. 10 such that the voltages across these capacitors are approximately equivalent to one-half the voltage on the line Vin of FIG. 10. Pre-conditioning is performed such that little disturbance occurs to the output voltage on the line Vout of FIG. 10. The pre-conditioning operation is divided into three steps. These steps are step "one" (or "first"), "two" (or "second"), and "three" (or "third"). In step one Caux (1023) is charged or discharged until the voltage across Caux is approximately equivalent to the voltage on the line Vout of FIG. 10. Step two occurs when step one is complete. In step two the capacitor Cfly (1009) is charged or discharged until the voltage across Cfly is approximately equivalent to one-half of the voltage on the line Vin of FIG. 10. Step three occurs when step two is complete. In the third step Caux (1023) is charged or discharged until the voltage across Caux is approximately equivalent to one-half the voltage on the line Vin of FIG. 10.

Pre-conditioning as described herein operates for a wide range of voltage on the line Vout. For example, in applications such as battery charging, the voltage on the line Vout of FIG. 10 could be approximately equivalent to the voltage of a battery coupled to this line. In this example, when no battery is coupled to the line Vout of FIG. 10, the voltage on this line could be approximately zero. Pre-conditioning also operates for a wide ranges of initial voltage across Cfly 1009 and Caux 1023 of FIG. 10. The pre-conditioning operation described herein is used prior to normal operation of circuit 1000 of FIG. 10 for both the low and high voltage modes.

While the three steps of pre-conditioning are in operation, the transistors 1001, 1003, 1005, 1007, 1025 and 1027 are off. Prior to the operation of step one, the signals and circuit elements of the group of circuits 1041 are in the following states: the signal on the line charge fly in FIG. 10 is low; current sources 1043 and 1049 are disabled; the error amplifier 1053 is disabled; switch 1055 is closed grounding the gate of transistor 1051; and the transistors 1051, 1045, and 1047 are off. The sequence of the pre-conditioning steps prevents current conduction through the body diodes of transistors 1001, 1003, 1005, 1007, 1025 and 1027 of FIG. 10 by reverse biasing these diodes. By reverse biasing the body diodes of these transistors, the voltage at the switching node (1011 of FIG. 10) and the voltage on the line are not affected (except for negligible changes due to current leakage). During pre-conditioning the voltage at the switching node (1011 of FIG. 10) and the voltage on the line Vout of FIG. 10 are approximately fixed and thus approximately equivalent.

In the first pre-conditioning step no action is taken for a case where the voltage across Caux (1023) is approximately equivalent to the voltage on the line Vout of FIG. 10. When these voltages are not approximately equivalent, step one operates as described now. For a case where the voltage across Caux (1023 of FIG. 10) is less than the voltage on the line Vout, the charge on Caux (1023) is increased by enabling the current source 1049 of FIG. 10. When the voltage across Caux becomes approximately equivalent to the voltage on the line Vout of FIG. 10, the current source 1049 is disabled. Following this action, for this case, step one is complete. In the first pre-conditioning step for a case where the voltage across Caux (1023 of FIG. 10) is greater than the voltage on the line Vout, the charge on Caux is reduced by turning on transistor 1047 of FIG. 10. When the voltage across Caux (1023) becomes approximately equivalent to the voltage on the line Vout of FIG. 10, the transistor 1047 is turned off. Following this action, for this case, step one is complete. When the first step is complete the voltage across Caux (1023) (and on the line Vaux) is approximately equivalent to the voltage on the line Vout of FIG. 10. Following the first step, the second pre-conditioning step is performed.

In the second pre-conditioning step no action is taken for a case where the voltage across Cfly (1009 of FIG. 10) is approximately equivalent to one-half the voltage on the line Vin. When this voltage relationship does not exist, step two operates. For a case where the voltage across Cfly (1009) is less than one-half the voltage on the line Vin of FIG. 10, the charge on Cfly (1009) is increased by placing a high logic level on the line CHARGE FLY. A high level on this line enables the current source 1043 and the error amplifier 1053 of FIG. 10 and also opens the switch 1055 of FIG. 10. (Prior to the operation of step two, the transistor 1045 is off as described hereinabove.) When the voltage across Cfly becomes approximately equivalent to one-half the voltage on the line Vin of FIG. 10, a logic low level is placed on the line CHARGE FLY. A logic low on the line CHARGE FLY disables the current source 1043 and disables the error amplifier 1053 of FIG. 2. A logic low on the line CHARGE FLY of FIG. 10 also closes the switch 1055. When the switch 1055 is closed the transistor 1051 is off. When the signal on the line CHARGE FLY is a logic high as described hereinabove, the error amplifier 1053 in conjunction with transistor 1051 regulates the current flow through Cfly (1009) such that the voltage on the line Vtop of FIG. 10 is approximately equivalent to the voltage on the line Vout. After completing the hereinabove described actions for this case, step two is complete. In the second step for a case where the voltage across Cfly (1009) is greater than one-half the voltage on the line Vin of FIG. 10, the charge on Cfly is reduced by turning on transistor 1045. (As described hereinabove, prior to the operation of step two, the current source 1043 and the error amplifier 1053 of FIG. 10 are disabled, and transistor 1051 is off) When the voltage across Cfly (1009) becomes approximately equivalent to one-half the voltage on the line Vin of FIG. 10, the transistor 1045 is turned off. Following this action, for this case, step two is complete. When the second step is complete the voltage across Cfly (1009) is approximately equivalent to one-half the voltage on the line Vin of FIG. 10. Following the second step, the third step is performed.

At the completion of the first step the voltage across Caux (1023 of FIG. 10) is approximately equivalent to Vout as described hereinabove. In the third pre-conditioning step the voltage across Caux (1023) is modified to be approximately equivalent to one-half the voltage on the line Vin in FIG. 10. No action is taken in step three for a case were this voltage relationship already exists at the beginning of step three. In step three, for a case where the voltage across Caux (1023 of FIG. 10) is less than one-half the voltage on the line Vin, the charge on Caux (1023) is increased by enabling the current source 1049 of FIG. 10 using the line CHARGE AUX. (Prior to the operation of step three, the transistor 1047 is off as described hereinabove.) When the voltage across Caux (1023) becomes approximately equivalent to one-half the voltage on the line Vin of FIG. 10, the current source 1049 is disabled. Following this action, for this case, step three is complete. In the third step for a case where the voltage across Caux (1023 of FIG. 10) is greater than one-half the voltage on the line Vin, the charge on Caux is decreased by turning on transistor 1047 of FIG. 10 using the line AUX BLEED. (Prior to the operation of step three, the current source 1049 of FIG. 10 is disabled as described hereinabove.) When the voltage across Caux (1023) becomes approximately equivalent one-half the voltage on the line Vin, the transistor 1047 is turned off. Following this action, for this case, step three is complete. When the third step is complete the voltage across Caux (1023) is approximately equivalent to one half the voltage on the line Vin of FIG. 10.

Following the completion of the third step, pre-conditioning is complete, and the example arrangement of FIG. 10 begins normal operation as described hereinabove.

Pre-conditioning is controlled by a control circuit that is not illustrated in FIG. 10 for simplicity of explanation. The functions of this control circuit include the following: compare the voltage across Caux 1023 of FIG. 10 to the voltage on the line Vout (or the approximately equivalent voltage of the switching node 1011); compare the voltages across Caux 1023 and Cfly 1009 of FIG. 10 to one-half the voltage on the line Vin; control the logic level on the line charge fly of FIG. 10; enable and disable the current source 1049; and control the on-off state of transistors 1045 and 1047.

The result of the pre-conditioning functionality described hereinabove is that the example arrangement of FIG. 10 begins normal operation with the voltages across Caux 1023 and Cfly 1009 approximately equivalent to one-half the voltage on the line Vin. Because the circuit is preconditioned to set these voltages prior to operation, the arrangement in FIG. 10 can be implemented with lower voltage transistors for transistors 1001, 1003, 1005, and 1007. In contrast, higher voltage transistors may be necessary for an implementation where the initial voltages across these capacitors are such that larger voltage drops across the transistors 1001, 1003, 1005, and 1007 are possible.

Figure 11:
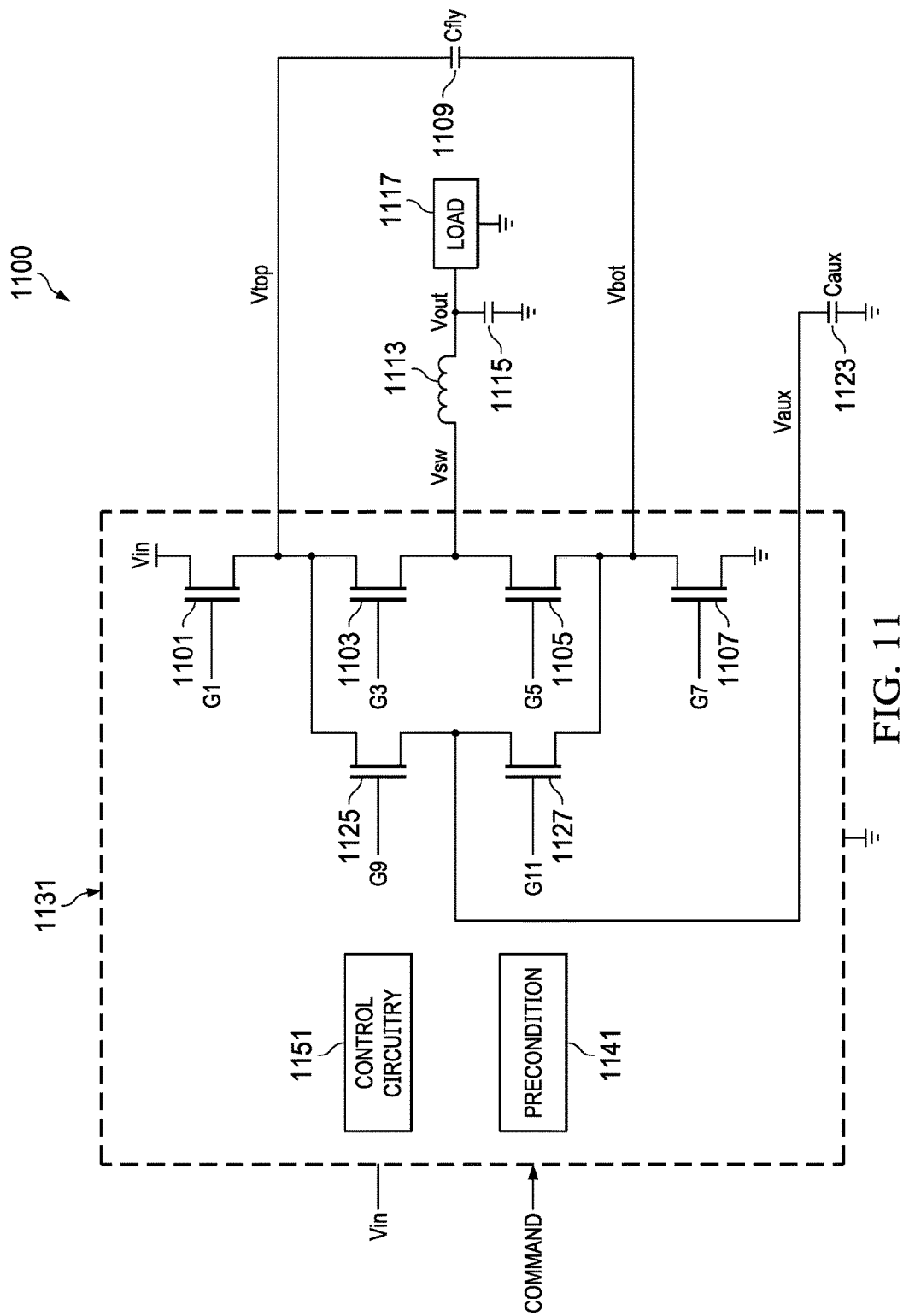
FIG. 11 is another circuit diagram for an example three-level converter including an integrated circuit for selected portions of the circuitry.

FIG. 11 is a block diagram of an arrangement 1100 that corresponds to the example arrangement of FIG. 10. In an example implementation, portions of the circuit 1100 can be formed as a single integrated circuit 1131. In additional example implementations, the circuit 1131 can be formed using multiple integrated circuits and/or discrete components on a board or a module. Multiple integrated circuits can be packaged in a single unit, such as stacked die packages or multichip modules, for ease of use and to further increase integration. User defined semi-custom integrated circuits including field programmable gate arrays (FPGAs), complex programmable logic devices (CPLDs), and application specific integrated circuit (ASIC) devices can be used to implement the circuit of FIG. 4. Custom integrated circuits can also be used. In example arrangements, the capacitors 1123, 1109 can be incorporated into the integrated circuit 1131. Alterative arrangements can place the passive elements such as the capacitors 1123, 1109 and inductor 1113, capacitor 1115 or some of these elements into a module, SIP, stacked package, or stacked die package along with the circuits in 1131.

In the example arrangement 1100 of FIG. 11 the circuit 1131 corresponds to a portion of circuit 1000 of FIG. 10. In addition, the arrangement 1100 includes the following circuit elements: the capacitor Cfly 1109 corresponding to the capacitor Cfly 1009 of FIG. 10; the inductor 1113 corresponding to the inductor 1013 of FIG. 10; the capacitor 1115 corresponding to the capacitor 1015 of FIG. 10; and the capacitor Caux 1123 corresponding to the capacitor Caux 1023 of FIG. 10. The block labeled "load" in FIG. 11 (block 1117) corresponds to the circuit coupled to the line Vout of FIG. 10 being powered by circuit 1000 of FIG. 10. This circuit being powered by circuit 1000 of FIG. 10 is not illustrated in FIG. 10. The lines labeled Vin, Vtop, Vsw, Vbot, Vout, and Vaux in FIG. 11 correspond to the lines in FIG. 10 with these same labels. The ground symbols in FIG. 11 correspond to the ground symbols in FIG. 10. The precondition circuit 1141 corresponds to the precondition circuitry 1041 in FIG. 10 and operates as described hereinabove. The control circuitry 1151 provides the gate signals G9, G11, G1, G3, G5 and G7 to transistors 1125, 1127, 1101, 1103, 1105, and 1107 and also controls the precondition circuitry 1141.

In FIG. 11, the circuitry 1131 including the transistors 1101, 1103, 1105, 1107, 1125 and 1127, control circuitry 1151, and precondition circuitry 1141, can be implemented as a three-level converter integrated circuit using a monolithic IC. Alternatively, multiple silicon dies can be used to form circuitry 1131, these multiple silicon dies can be packaged together in multichip module to form a single integrated package, or, these can be packaged separately and placed on a circuit board or other module for use in a system. In these implementations the larger passive elements such as the inductor 1113, and the capacitors 1190, 1115 and 1123, are implemented as discrete or separate components. In some multichip modules or system in a package (SIP) examples, these passive components, or some of them, can be packaged along with silicon dies implementing the circuit 1131, or can be packaged together with integrated circuit packages implementing 1131. Stacked dies and stacked package implementations can be used to further integrate the arrangement shown in 1100, to save on circuit board area and to reduce the need for conductive traces and connections between elements.

In FIG. 11 the top plate of Cfly (1109) is coupled to the line Vtop. The bottom plate of this capacitor 1109 is coupled to the line Vbot. The top plate of Caux (1123) is coupled to the line Vaux in FIG. 11. The bottom plate of this capacitor 1123 is coupled to ground. One terminal of the inductor 1113 is coupled to the line Vsw of FIG. 11. The other terminal of the inductor 1113 is coupled to the line Vout. The line Vout of FIG. 11 is also coupled to the load (block 1117) and to one plate of the output capacitor 1115. The other plate of this capacitor is coupled to ground. The lines labeled Vin, Vtop, Vsw, Vbot, and Vaux in FIG. 11 are coupled to circuit 1131 of FIG. 11. The lines Vtop, Vbot, and Vaux are both inputs to and outputs from circuit 1131.

In operation circuit 1100 of FIG. 11 functions similarly to the circuit 1000 of FIG. 10 as described hereinabove and the function of circuit 1100 is not further described herein, for simplicity of explanation.

Circuits in addition to those illustrated in FIG. 11 may be present in circuit 1100 when implemented for specific applications. Such circuits include an interface such as an interface to receive the Command input to 1131 coupled to an external circuit such as a microprocessor, and a circuit coupled to the line Vin of FIG. 11 that provides power to circuit 1131 of FIG. 11. Additional circuits are not described herein for simplicity of explanation.

Alternative arrangements can be implemented with circuits or components that differ from those described hereinabove. For example, while the arrangement of FIG. 11 includes the precondition circuitry, in an alternative arrangement the three-level converter can be implemented without the precondition circuitry. The use of this approach may result in a circuit that takes several cycles to reach an operating condition where the voltage across the Cfly capacitor settles at the desired condition of Vin/2, and the transistors used in the three-level converter may need to be of an increased size to accommodate the voltages that may occur during power up or start up, but otherwise the alternative approach without the precondition circuitry will operate correctly.

Figure 12:
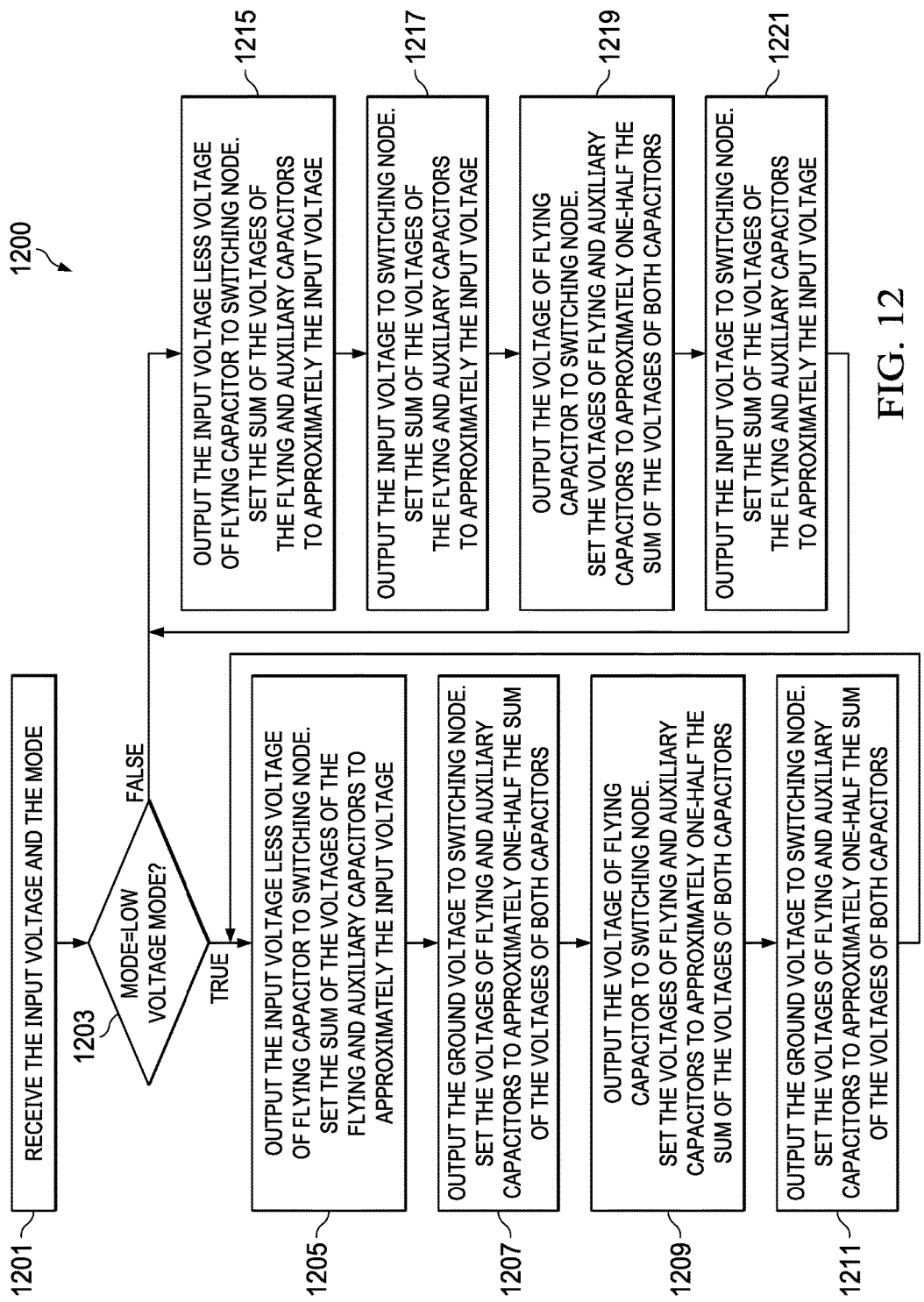
FIG. 12 is a flow diagram for an example method.
Figure 13A:
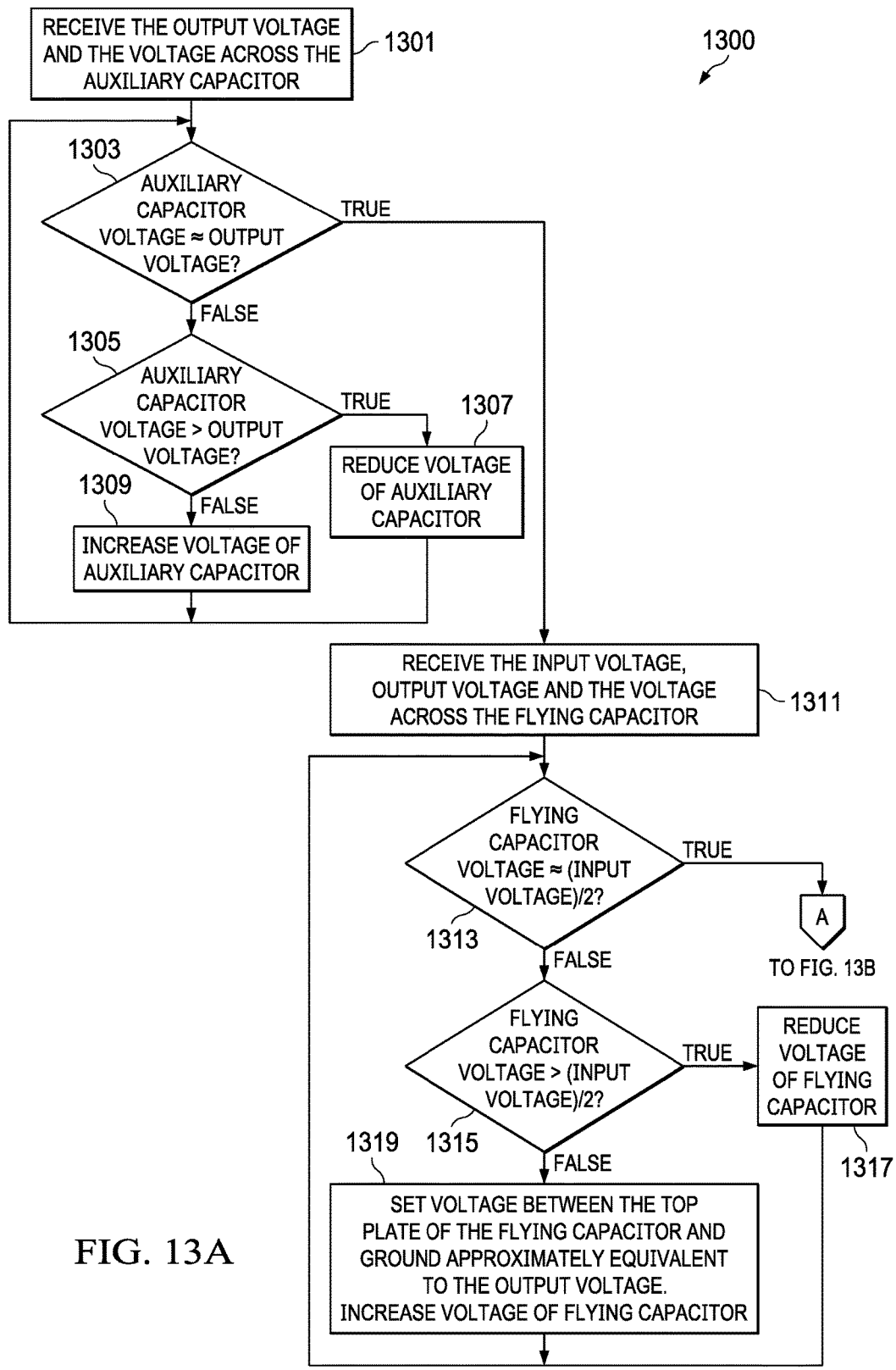
FIGS. 13A-13B illustrate a flow diagram for another method.
Figure 13B:
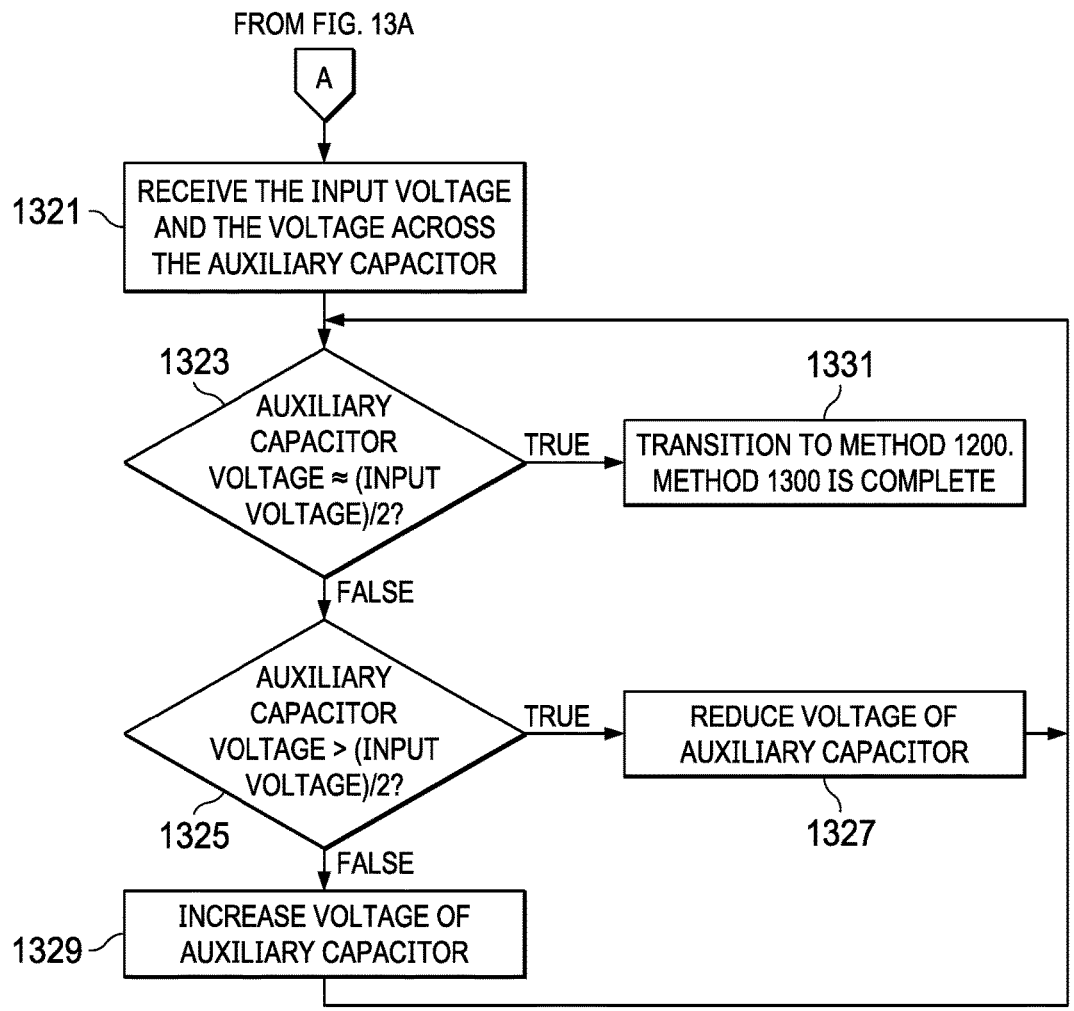

FIG. 12 illustrates in a flow diagram a method 1200. FIGS. 13A-13B illustrate in a flow diagram an additional method 1300. Methods 1200 and 1200 combined are an example method arrangement. Method 1300 is the preconditioning functionality of the method arrangement. Method 1200 is the normal operation functionality of the method arrangement.

Method 1200 of FIG. 12 begins at steps 1201. At step 1201 the input voltage and the mode are received. From step 1201 the method transitions to step 1203. At step 1203 a determination is made. If the mode is the low voltage mode as described hereinabove the determination is true ("TRUE") and the method transitions to step 1205.

Steps 1205, 1207, 1209 and 1211 describe steps for operating the three-level converter in the four states for the low voltage mode as described hereinabove and as illustrated in FIGS. 9A, 9B and 9C.

At step 1205 the input voltage Vin reduced by the voltage of the flying capacitor is output to the switching node. Also at step 1205 the sum of voltages of the flying and auxiliary capacitors is set to approximately the input voltage, that is, the capacitors are arranged in series between the input voltage and ground. From step 1205 the method transitions to step 1207. This operation corresponds to the circuit diagram of FIG. 9A for the first state of the low voltage mode.

At step 1207 the ground voltage is output to the switching node. Also at step 1207 the voltages of flying and auxiliary capacitors are set to approximately one-half the sum of the voltages of both capacitors. The capacitors are arranged in parallel with the top plates coupled together and each has a bottom plate coupled to ground. From step 1207 the method transitions to step 1209. This operation corresponds to the circuit diagram of FIG. 9B for the second state of the low voltage mode.

At step 1209 the voltage of the flying capacitor is output to the switching node. Also at step 1209 the voltages of flying and auxiliary capacitors are set to approximately one-half the sum of the voltages of both capacitors. This operation corresponds to the circuit diagram of FIG. 9C. In step 1209, the capacitors are coupled in parallel and supply current to the load coupled to the output terminal. From step 1209 the method transitions to step 1211.

At step 1211 the ground voltage (approximately zero volts) is output to the switching node. Also at step 1211 the voltages of flying and auxiliary capacitors are to approximately one-half the sum of the voltages of both capacitors. This operation corresponds to the circuit diagram in FIG. 9B. From step 1211 the method transitions to step 1205.

Returning to step 1203, if the comparison at 1203 is false ("FALSE" in FIG. 12) indicating the high voltage mode, the method transitions to step 1215. The method will operate the three-level converter in the four states for the high voltage mode described hereinabove in steps 1215, 1217, 1219 and 1221, repeating the four states in each cycle.

At step 1215 the input voltage reduced by the voltage of flying capacitor is output to the switching node. Also at step 1215 the sum of voltages of the flying and auxiliary capacitors is set to approximately the input voltage. This operation to the circuit diagram in FIG. 9A. From step 1215 the method transitions to step 1217.

At step 1217 the input voltage is output to the switching node. Also at step 1217 the sum of voltages of the flying and auxiliary capacitors is set to approximately the input voltage. This operation corresponds to the circuit diagram of FIG. 9D. From step 1217 the method transitions to step 1219.

At step 1219 the voltage of the flying capacitor is output to the switching node. Also at step 1219 the voltages of flying and auxiliary capacitors are set to approximately one-half the sum of the voltages of both capacitors. This step corresponds to the circuit diagram of FIG. 9C. From step 1219 the method transitions to step 1221.

At step 1221 the input voltage is output to the switching node. Also at step 1221 the sum of voltages of the flying and auxiliary capacitors is set to approximately the input voltage. This operation corresponds to the circuit diagram of FIG. 9D. From step 1221 the method transitions to step 1215.

It should be noted that the amount of time elapsed in the various steps numbered 1205 through 1221 is determined by a regulation method that controls the output voltage and which is not described herein for simplicity of explanation. As described hereinabove, the control and regulation methods that can be used include PWM and PFM regulation.

FIGS. 13A and 13B illustrate a method 1300 for performing the preconditioning operations described hereinabove. As shown in FIG. 13A, at the first step 1301 the output voltage and the voltage across the auxiliary capacitor are received. From step 1301 the method transitions to step 1303. At step 1303 a determination is made. If the voltage of the auxiliary capacitor is approximately equal to the output voltage, the determination is true (shown as "TRUE" in FIG. 13A) and the method transitions to step 1311. Returning to step 1303, if the comparison is false ("FALSE" in FIG. 13A) the method transitions to step 1305. At step 1305 an additional determination is made. If the voltage of the auxiliary capacitor is greater than the output voltage, the comparison is true and the method transitions to step 1307.

At step 1307 the voltage of the auxiliary capacitor is reduced. From step 1307 the method transitions to step 1303. Returning to step 1305, if the comparison is false ("FALSE" in FIG. 13A) the method transitions to step 1309. At step 1309 the voltage of the auxiliary capacitor is increased. From step 1309 the method transitions to step 1303.

If the determination at step 1303 is true ("TRUE" in FIG. 13A), the method transitions to step 1311. At step 1311 the input voltage, the output voltage, and the voltage across the flying capacitor are received. From step 1311 the method transitions to step 1313. At step 1313 a comparison is made. If the voltage of the flying capacitor is approximately equal to one-half the input voltage, the comparison is true and the method transitions to step 1321. Returning to step 1313, if the comparison is false the method transitions to step 1315. At step 1315 another comparison is made. If the voltage of the flying capacitor is greater than one-half the input voltage, the comparison is true and the method transitions to step 1317. At step 1317 the voltage of the flying capacitor is reduced. From step 1317 the method transitions to step 1313. Returning to step 1315, if the comparison is false, the method transitions to step 1319. At step 1319 the voltage between the top plate of the flying capacitor and ground is set approximately equivalent to the output voltage. Also in step 1319 the voltage of the flying capacitor is increased. From step 1319 the method transitions to step 1313.

When the determination at step 1313 is true, the method transitions to step 1321 in FIG. 13B. At step 1321 the input voltage and the voltage across the auxiliary capacitor are received. From step 1321 the method transitions to step 1323. At step 1323 a comparison is made. If the voltage of the auxiliary capacitor is approximately equal to one-half the input voltage, the comparison is true and the method transitions to step 1331. At step 1331, the method transitions to method 1200 described hereinabove, and method 1300 is complete. Returning to step 1323, if the comparison is false the method transitions to step 1325. At step 1325 comparison is made. If the voltage of the auxiliary capacitor is greater than one-half the input voltage, the comparison is true and the method transitions to step 1327. At step 1327 the voltage of the auxiliary capacitor is reduced. From step 1327 the method transitions to step 1323. Returning to step 1325, if the comparison is false, the method transitions to step 1329. At step 1329 the voltage of the auxiliary capacitor is increased. From step 1329 the method transitions to step 1323.

Note that the order of steps illustrated in the example methods of FIGS. 12 and 13A-13B illustrate one approach to performing the methods 1200 and 1300. Alternative methods can be formed using a different order of steps. For example, in step 1203 of FIG. 12 the comparison can be modified to be true if the mode is the high voltage mode. In this case step 1203 would transition to step 1215 for a true comparison and to step 1205 for a false comparison. An alternative arrangement can be formed that can transition between the low and high voltage modes multiple times while method 1200 is operating. Such an alternative method can be formed by modifying steps 1211 and 1221 to transition to step 1203 in lieu of transitioning to step 1205 from step 1211 and transitioning to step 1215 from step 1221.

Figure 14:
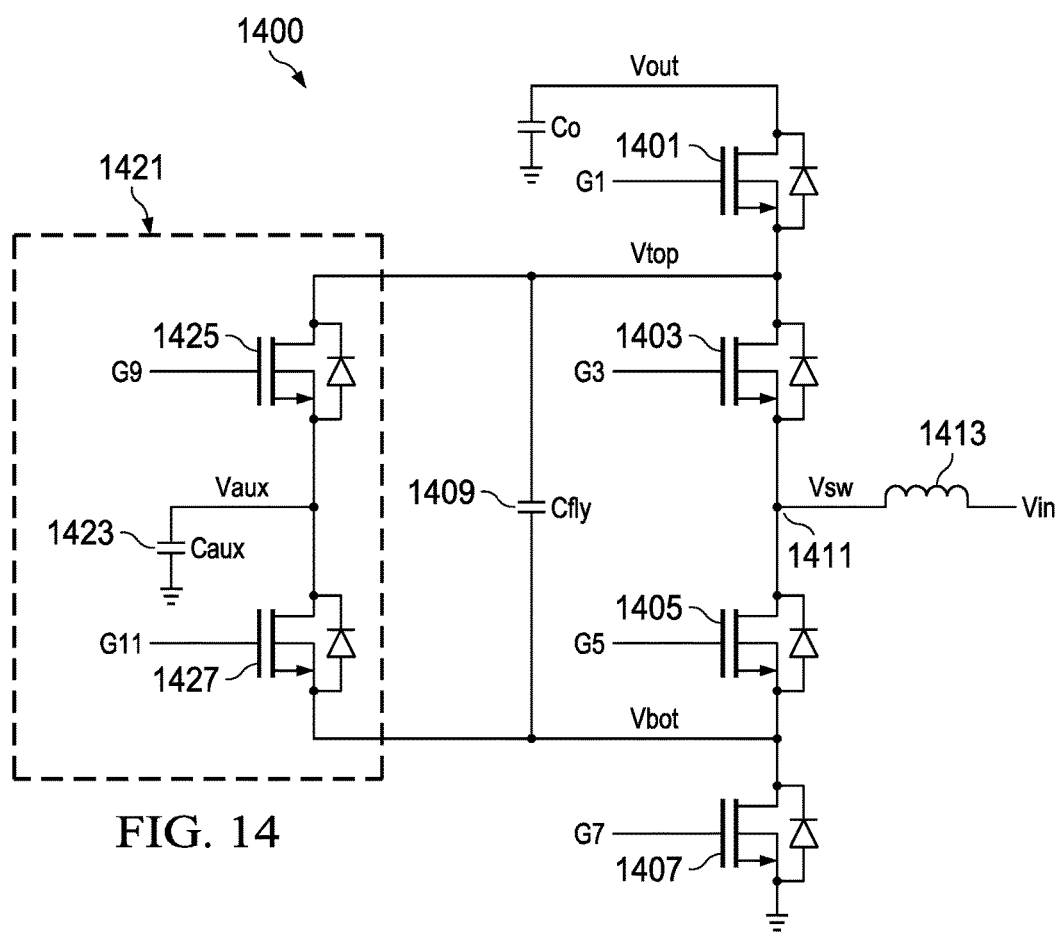
FIG. 14 is a further circuit diagram for an alternative example three level converter arrangement for a boost configuration.

FIG. 14 is a circuit block diagram for an alternative arrangement 1400 for a boost, or "step-up" converter using a three level converter with the switched capacitor voltage divider. In FIG. 14, similar elements to those in FIG. 8 have similar reference labels, for clarity of explanation. For example, inductor 1413 corresponds to similar inductor 813 in FIG. 8.

In FIG. 14, an input voltage Vin is coupled through an inductor to the switching node 1411. An output voltage Vout is shown with the output capacitor Co connected between the output voltage Vout and a ground or reference potential. The transistors 1401, 1403, 1405 and 1407 with gate terminals G1, G3, G5 and G7 are operated in sequence to provide the output voltage Vout from a lower input voltage by modifying the duty cycle for three modes of operation in the same manner as described hereinabove with respect to FIG. 8. However, in the arrangement of FIG. 14, the output voltage is higher than the input voltage Vin, so that the converter is a boost or step-up DC to DC converter. The switched capacitor divider circuit includes circuit 1421 with an auxiliary capacitor Caux, 1423, coupled to the node Vtop and to the node Vbot, selectively, using the transistors 1425 and 1427 with gate terminals G9, G11 in the same manner as described hereinabove with respect to FIG. 8. A control circuit, not shown in FIG. 14, provides the gate signals on gate terminals G1, G3, G5, G7, G9 and G11 as needed to provide the voltage Vout/2 on capacitor Cfly and Caux. These capacitors operate as described hereinabove with respect to FIG. 8 and the transistors are controlled in the same manner in the boost mode as was described hereinabove for the buck mode. The use of the auxiliary capacitor and the circuitry 1421 provides a switched capacitor voltage divider to maintain the voltage Vfly at the desired Vout/2 voltage.

Modifications are possible in the described arrangements, and other arrangements are possible within the scope of the claims.

What is claimed is:

1. An apparatus comprising:
a multi-level switching power supply coupled between a voltage input terminal and a ground terminal, the multi-level switching power supply including a switching node, a first node between the voltage input terminal and the switching node, and a second node between the switching node and the ground terminal; and
an auxiliary circuit having:
   an auxiliary node;
   a first auxiliary switch coupled between the first node and the auxiliary node;
   a capacitor coupled between the auxiliary node and the ground terminal; and
   a second auxiliary switch coupled between the auxiliary node and the second node.

2. The apparatus of claim 1, further comprising:
a voltage output terminal; and
an inductor coupled between the switching node and the voltage output terminal.

3. The apparatus of claim 1, wherein the multi-level switching power supply includes a capacitor coupled between the first node and the second node.

4. The apparatus of claim 1, wherein the multi-level switching power supply includes:
   a first switch coupled between the voltage input terminal and the first node; and
   a second switch coupled between the first node and the switching node.

5. The apparatus of claim 1, wherein the multi-level switching power supply includes:
   a first switch coupled between the switching node and the second node; and
   a second switch coupled between the second node and the ground terminal.

6. The apparatus of claim 1, wherein the multi-level switching power supply includes:
   a first switch coupled between the voltage input terminal and the first node;
   a second switch coupled between the first node and the switching node;
   a third switch coupled between the switching node and the second node; and
   a fourth switch coupled between the second node and the ground terminal.

7. The apparatus of claim 1, further comprising:
a precondition circuit having:
   a current source coupled between the voltage input terminal and the first node;
   a first transistor coupled between the first node and the second node; and
   a second transistor coupled between the second node and the ground terminal.

8. The apparatus of claim 7, wherein the precondition circuit includes:
an error amplifier having a non-inverting input coupled to the first node, an inverting input coupled to a voltage output terminal, and an error amplified output coupled to a gate terminal of the second transistor.

9. The apparatus of claim 1, further comprising:
a precondition circuit having:
   a current source coupled between the voltage input terminal and the auxiliary node; and
   a transistor coupled between the auxiliary node and the ground terminal.

10. An integrated circuit (IC) comprising:
a switching power supply coupled between a voltage input terminal and a ground terminal, the switching power supply including a switching node, a first node between the voltage input terminal and the switching node, and a second node between the switching node and the ground terminal; and
an auxiliary circuit having:
   an auxiliary node;
   a first auxiliary switch coupled between the first node and the auxiliary node;
   a capacitor coupled between the auxiliary node and the ground terminal; and
   a second auxiliary switch coupled between the auxiliary node and the second node.

11. The IC of claim 10, wherein the switching power supply includes:
   a first switch coupled between the voltage input terminal and the first node; and
   a second switch coupled between the first node and the switching node.

12. The IC of claim 10, wherein the switching power supply includes:
   a first switch coupled between the switching node and the second node; and
   a second switch coupled between the second node and the ground terminal.

13. The IC of claim 10, wherein the switching power supply includes:
   a first switch coupled between the voltage input terminal and the first node;
   a second switch coupled between the first node and the switching node;
   a third switch coupled between the switching node and the second node; and
   a fourth switch coupled between the second node and the ground terminal.

14. An apparatus comprising:
a voltage input terminal, a ground terminal, and a voltage output terminal;
a flyback capacitor, an auxiliary capacitor, and an inductor coupled between a switching node and the voltage output terminal; and
a switching network configured to:
   during a charging state:
      establish a first circuit path from the voltage input terminal to a first plate of the flyback capacitor, and from a second plate of the flyback capacitor to the switching node; and
      establish a second circuit path from the switching node to a first plate of the auxiliary capacitor, and from a second plate of the auxiliary capacitor to the ground terminal; and
   during a discharging state:
      decouple the first circuit path and the second circuit path;
      establish a third circuit path from the switching node to the first plate of the flyback capacitor, and from the second plate of the flyback capacitor to the ground terminal; and
      establish a fourth circuit path from the switching node to the first plate of the auxiliary capacitor.

15. The apparatus of claim 14, wherein the switching network is configured to, during a low voltage transition state between the charging state and the discharging state:
decouple the first circuit path and the second circuit path;
establish a fifth circuit path from the first plate of the auxiliary capacitor to the first plate of the flyback capacitor, and from the second plate of the flyback capacitor to the ground terminal; and
establish a sixth circuit path from the switching node to the ground terminal.

16. The apparatus of claim 14, wherein the switching network is configured to, during a high voltage transition state between the charging state and the discharging state:
- decouple the first circuit path and the second circuit path from the switching node;
- establish a fifth circuit path from the second plate of the flyback capacitor to the first plate of the auxiliary capacitor; and
- establish a sixth circuit path from the voltage input terminal to the switching node.

17. The apparatus of claim 14, wherein the switching network includes:
- a first switch coupled between the voltage input terminal and a first node, the first node coupled to the first plate of the flyback capacitor;
- a second switch coupled between the first node and the switching node;
- a third switch coupled between the switching node and a second node, the second node coupled to the second plate of the flyback capacitor;
- a fourth switch coupled between the second node and the ground terminal;
- a fifth switch coupled between the first node and an auxiliary node, the auxiliary node coupled to the first plate of the auxiliary capacitor; and
- a sixth switch coupled between the auxiliary node and the second node.

18. The apparatus of claim 17, wherein:
the first circuit path includes:
- the first switch turned on to couple the voltage input terminal to the first plate of the flyback capacitor; and
- the third switch turned on to couple the second plate of the flyback capacitor to the switching node; and the second circuit path includes:
- the sixth switch turned on to couple the first plate of the auxiliary capacitor to the second node; and
- the third switch turned on to couple the second node to the switching node.

19. The apparatus of claim 17, wherein:
the third circuit path includes:
- the second switch turned on to couple the switching node to the first plate of the flyback capacitor; and
- the fourth switch turned on to couple the second plate of the flyback capacitor to the ground terminal; and the fourth circuit path includes:
- the second and fifth switches turned on to couple the switching node to the first plate of the auxiliary capacitor.

* * * * *